(12) United States Patent
Nakajima et al.

(10) Patent No.: US 11,577,524 B2
(45) Date of Patent: Feb. 14, 2023

(54) INKJET PRINTING APPARATUS AND PRINTING METHOD USING ADJUSTMENT PATTERN

(71) Applicant: CANON KABUSHIKI KAISHA, Tokyo (JP)

(72) Inventors: Yoshinori Nakajima, Kanagawa (JP); Keiji Kuriyama, Saitama (JP); Hidehiko Kanda, Kanagawa (JP); Takayuki Ushiyama, Chiba (JP); Naomi Yamamoto, Kanagawa (JP); Takeshi Yazawa, Kanagawa (JP); Akihiro Tomida, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 133 days.

(21) Appl. No.: 17/125,637

(22) Filed: Dec. 17, 2020

(65) Prior Publication Data

US 2021/0197579 A1    Jul. 1, 2021

(30) Foreign Application Priority Data

Dec. 26, 2019 (JP) ............................. JP2019-236668

(51) Int. Cl.
*B41J 2/21* (2006.01)
*B41J 11/00* (2006.01)

(52) U.S. Cl.
CPC ........... *B41J 2/2135* (2013.01); *B41J 2/2142* (2013.01); *B41J 2/2146* (2013.01); *B41J 11/005* (2013.01)

(58) Field of Classification Search
CPC ........ B41J 11/06; B41J 2/2135; B41J 2/2146; B41J 2/155; B41J 2/2142; B41J 11/005; B41J 11/42
See application file for complete search history.

(56) References Cited

U.S. PATENT DOCUMENTS 9,186,886 B2    11/2015    Ogawa

FOREIGN PATENT DOCUMENTS

| JP | 2010-143123 A | 7/2010 | |
|----|----|----|----|
| JP | 2010143123 A * | 7/2010 | |
| JP | 4894881 B2 * | 3/2012 | ............ B41J 29/393 |
| JP | 4894881 B2 | 3/2012 | |
| JP | 5063327 B2 | 10/2012 | |

* cited by examiner

*Primary Examiner* — Jannelle M Lebron
(74) *Attorney, Agent, or Firm* — Canon U.S.A., Inc. IP Division

(57) ABSTRACT

A print position adjustment mode is performed with high accuracy while consumption of print media is saved. An inkjet printing apparatus prints an adjustment pattern including multiple patches for adjusting print positions of dots by a print head on a print medium. Patches set next to each other in a scanning direction are printed above platen ribs at intervals based on rib pitches at which the platen ribs are arranged.

24 Claims, 23 Drawing Sheets

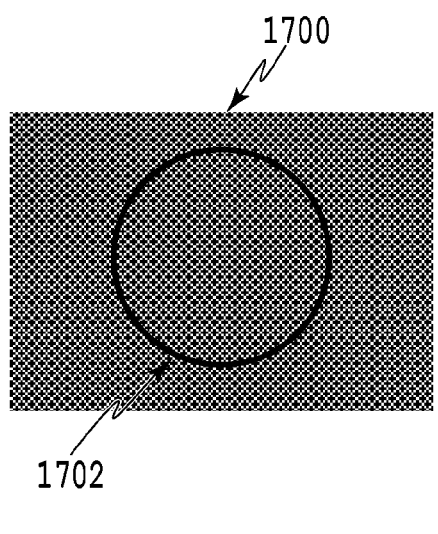
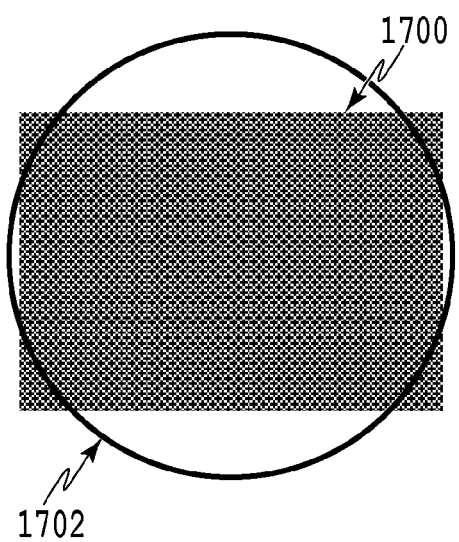
FIG.14A  FIG.14B

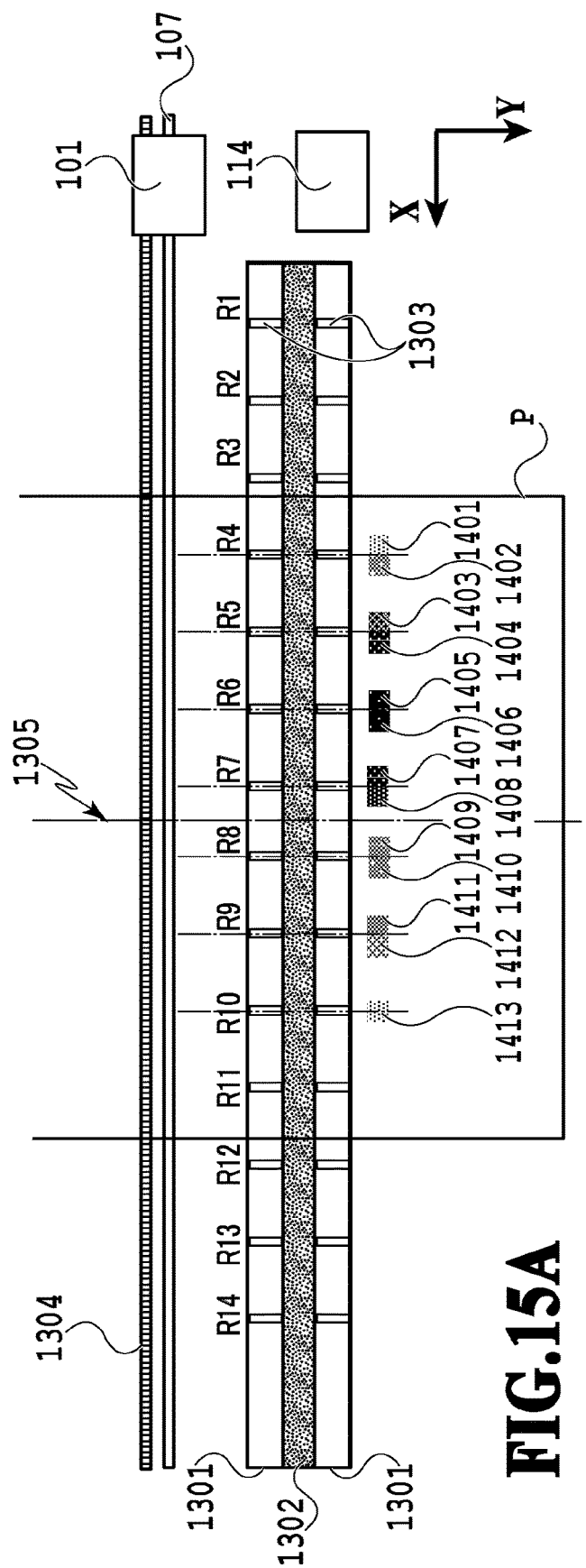
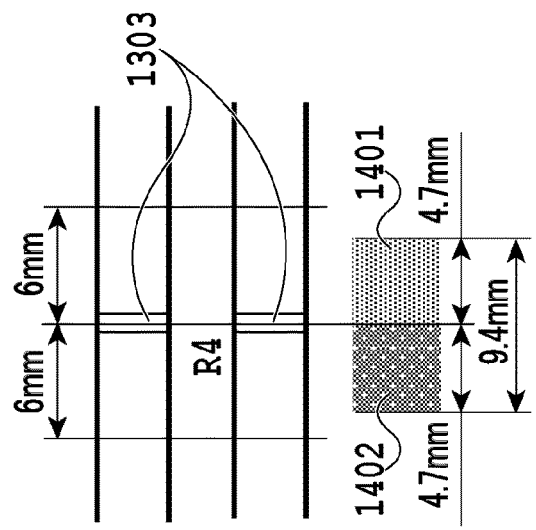
FIG.15A
FIG.15B

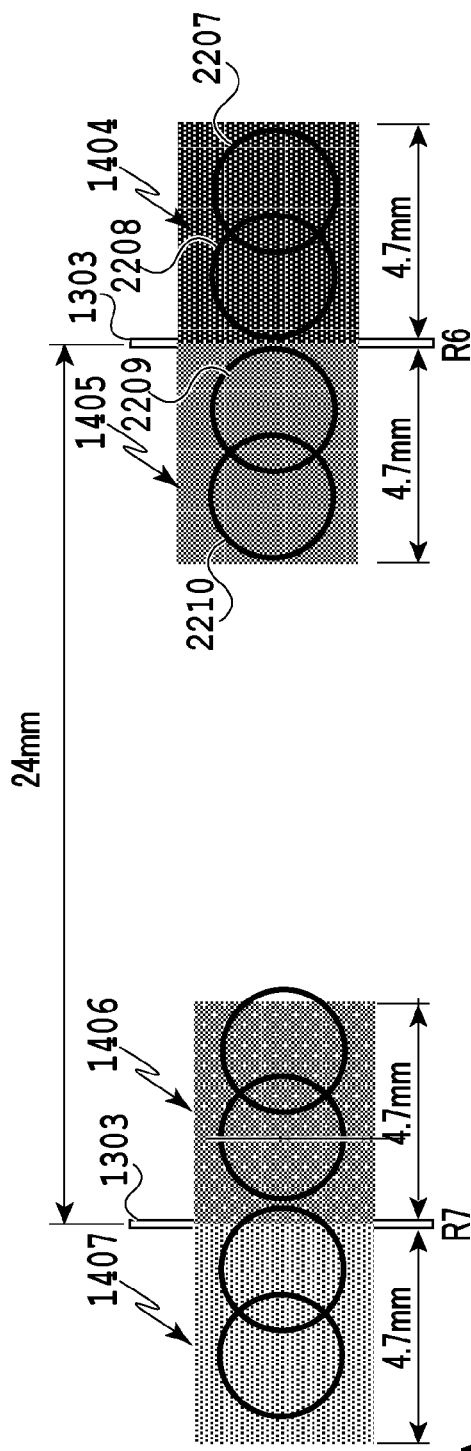
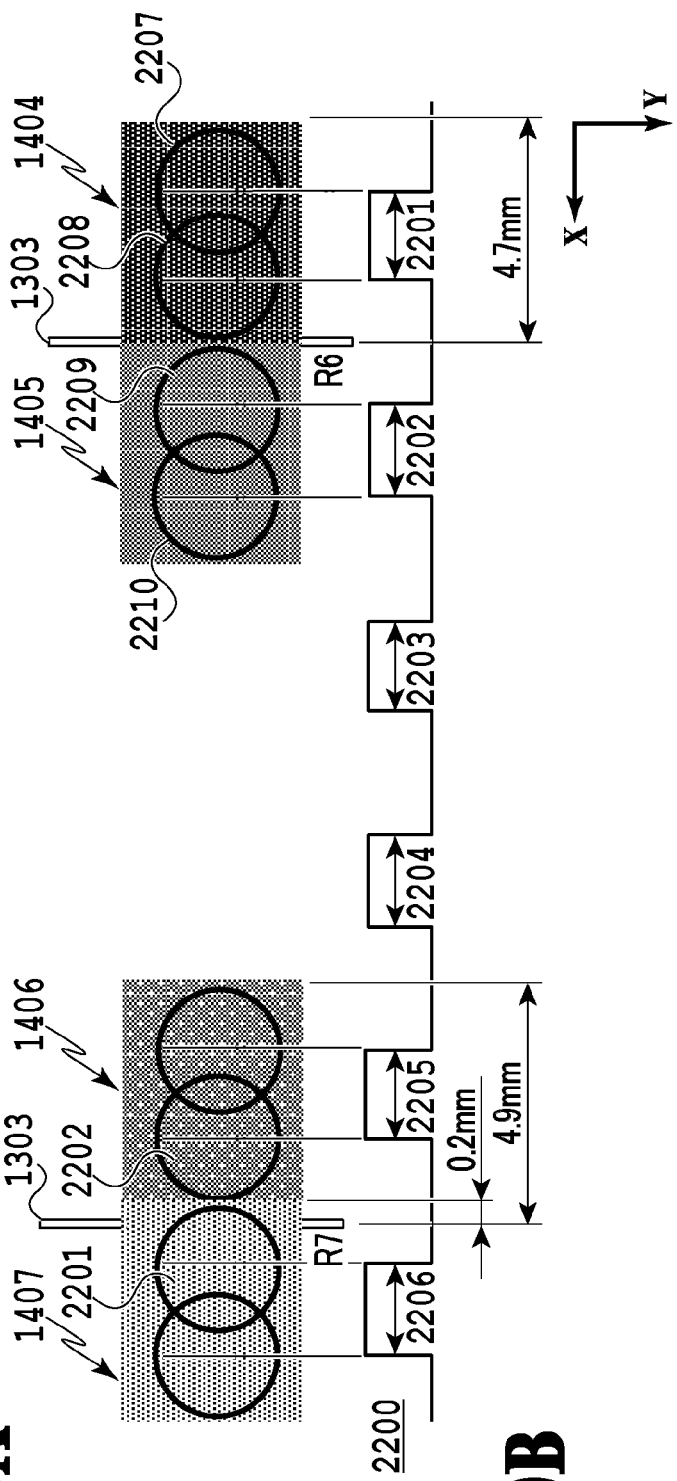
FIG.20A
FIG.20B

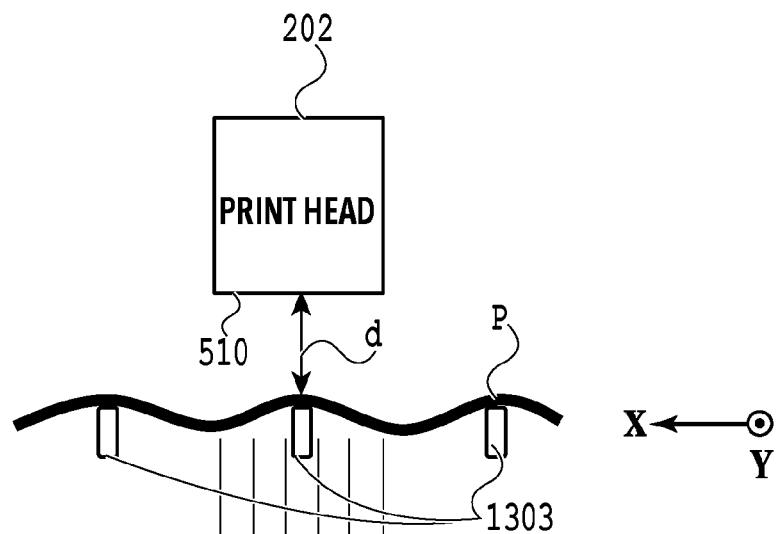
FIG.21A
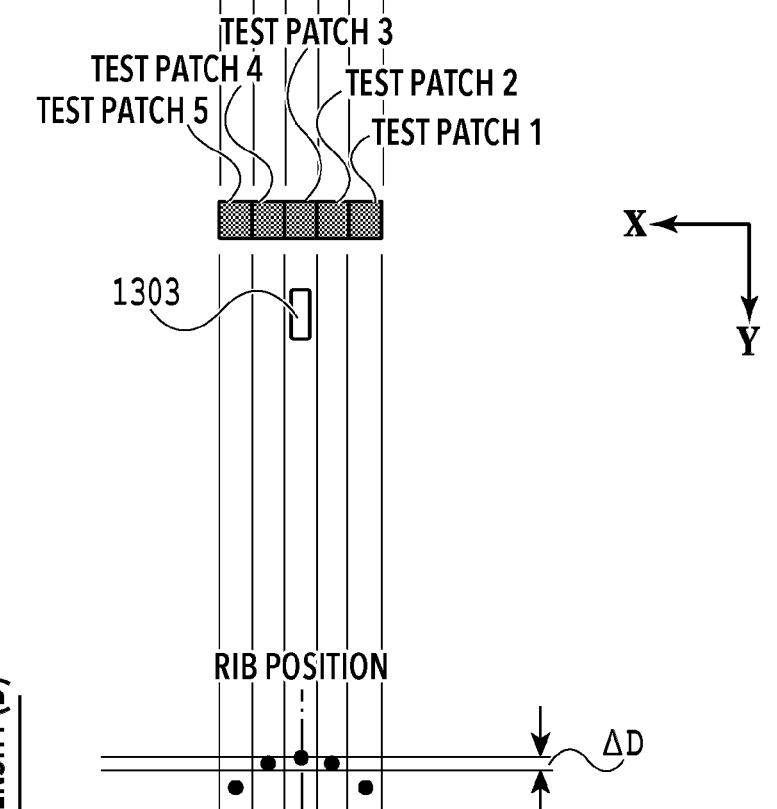
FIG.21B
FIG.21C

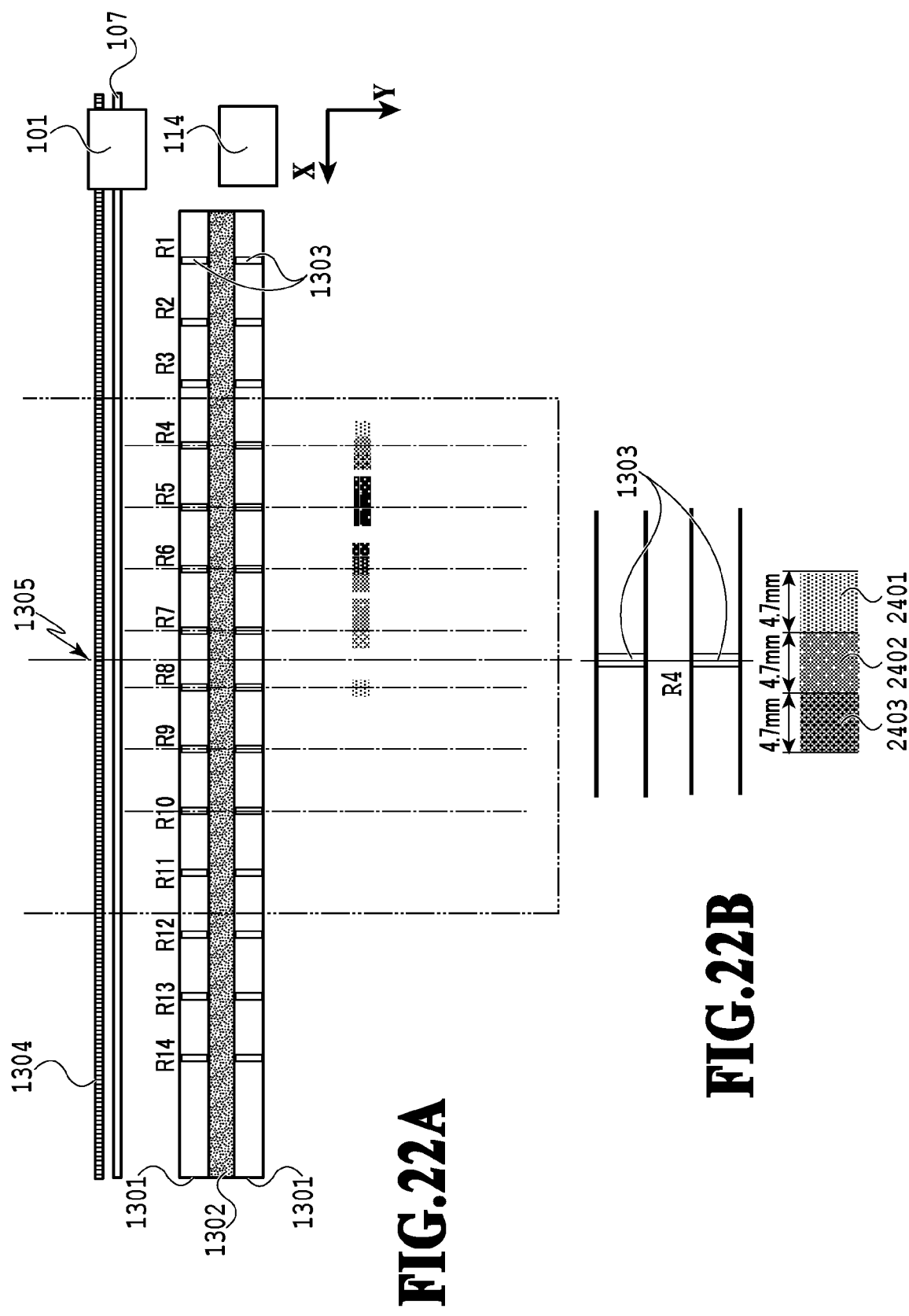

INKJET PRINTING APPARATUS AND PRINTING METHOD USING ADJUSTMENT PATTERN

BACKGROUND

Technical Field

One disclosed aspect of the embodiments relates to an inkjet printing apparatus and a printing method using adjustment pattern in the apparatus.

Description of the Related Art

Some inkjet printing apparatus is capable of executing a print position adjustment mode for adjusting the print positions of dots on a print medium. For example, in the case of adjusting the print positions in forward and backward scans, multiple patches in which the relative print position in the forward scan and backward scan by a print head is gradually shifted are printed on a print medium in the print position adjustment mode. Then, the patch that achieved the smallest print position misalignment is selected and the print position used in the selected patch is set as an adjustment value.

Japanese Patent Laid-Open No. 2010-143123 discloses a print position adjustment method in which multiple patches having mutually different dot print positions are printed in association with respective platen ribs that support a print medium, thereby keeping small an influence due to a variation of the distance between the print head and the print medium.

In recent years, along with increases in the number of types of inks used for printing and the print resolution, the number of items for which the print positions need to be adjusted has also increased. For this reason, in the print position adjustment mode, it is necessary to further print a large number of patches in addition to the aforementioned patches for adjustment in the forward and backward scans.

However, since the printing apparatus includes only a limited number of platen ribs, the method of Japanese Patent Laid-Open No. 2010-143123 requires many print media or a print medium in a large size for printing the patches for adjustment, which is unfavorable from the viewpoint of usability.

SUMMARY

An aspect of the embodiments aims to solve the above problem. Therefore, an object of the disclosure is to execute a print position adjustment mode with high accuracy while saving consumption of print media.

In a first aspect of the disclosure, a printing apparatus includes a printing unit, a scanning unit, a conveyance unit, and a plurality of platen ribs. The printing unit is configured to print dots on a print medium by applying ink droplets. The scanning unit is configured to scan the printing unit in a scanning direction. The conveyance unit is configured to convey a print medium in a conveyance direction crossing the scanning direction. The plurality of platen ribs is configured to be arranged on a conveyance route of a print medium at positions facing the printing unit at predetermined pitches in the scanning direction and to support the print medium. The printing unit prints an adjustment pattern on a print medium in response to reception of an instruction to adjust print positions of ink droplets to be applied by the printing unit. The adjustment pattern includes a plurality of patches and is for use for adjustment. The printing unit prints the adjustment pattern such that two or more patches are printed next to each other in the scanning direction in a neighboring area around a certain one of the plurality of platen ribs and that no patches are printed in a middle area between the certain platen rib and another platen rib next to the certain platen rib in the scanning direction.

In a second aspect of the disclosure, an adjustment pattern printing method is provided for a printing apparatus that includes a printing unit, a scanning unit, a conveyance unit, and a plurality of platen ribs. The printing unit is configured to print dots on a print medium by applying ink droplets. The scanning unit is configured to scan the printing unit in a scanning direction. The conveyance unit is configured to convey a print medium in a conveyance direction crossing the scanning direction. The plurality of platen ribs is configured to be arranged on a conveyance route of a print medium at positions facing the printing unit at predetermined pitches in the scanning direction and to support the print medium. The printing unit prints an adjustment pattern on a print medium in response to reception of an instruction to adjust print positions of ink droplets to be applied by the printing unit. The adjustment pattern includes a plurality of patches and is for use for adjustment. The printing unit prints the adjustment pattern such that two or more patches are printed next to each other in the scanning direction in a neighboring area around a certain one of the plurality of platen ribs and that no patches are printed in a middle area between the certain platen rib and another platen rib next to the certain platen rib in the scanning direction.

Further features of the disclosure will become apparent from the following description of exemplary embodiments with reference to the attached drawings.

BRIEF DESCRIPTION OF THE DRAWINGS

FIGS. 14A and 14B are diagrams each depicting a relation between a patch and a spot diameter of the reflection-type optical sensor.

FIGS. 15A and 15B are views illustrating a layout of patches in an adjustment pattern.

FIGS. 20A and 20B are diagrams illustrating print positions of patches in a fourth embodiment.

FIGS. 21A to 21C are diagrams illustrating processing of setting the number of patches in a fifth embodiment.

FIGS. 22A and 22B are diagrams illustrating a layout of patches in the fifth embodiment.

DESCRIPTION OF THE EMBODIMENTS

First Embodiment

Figure 1:
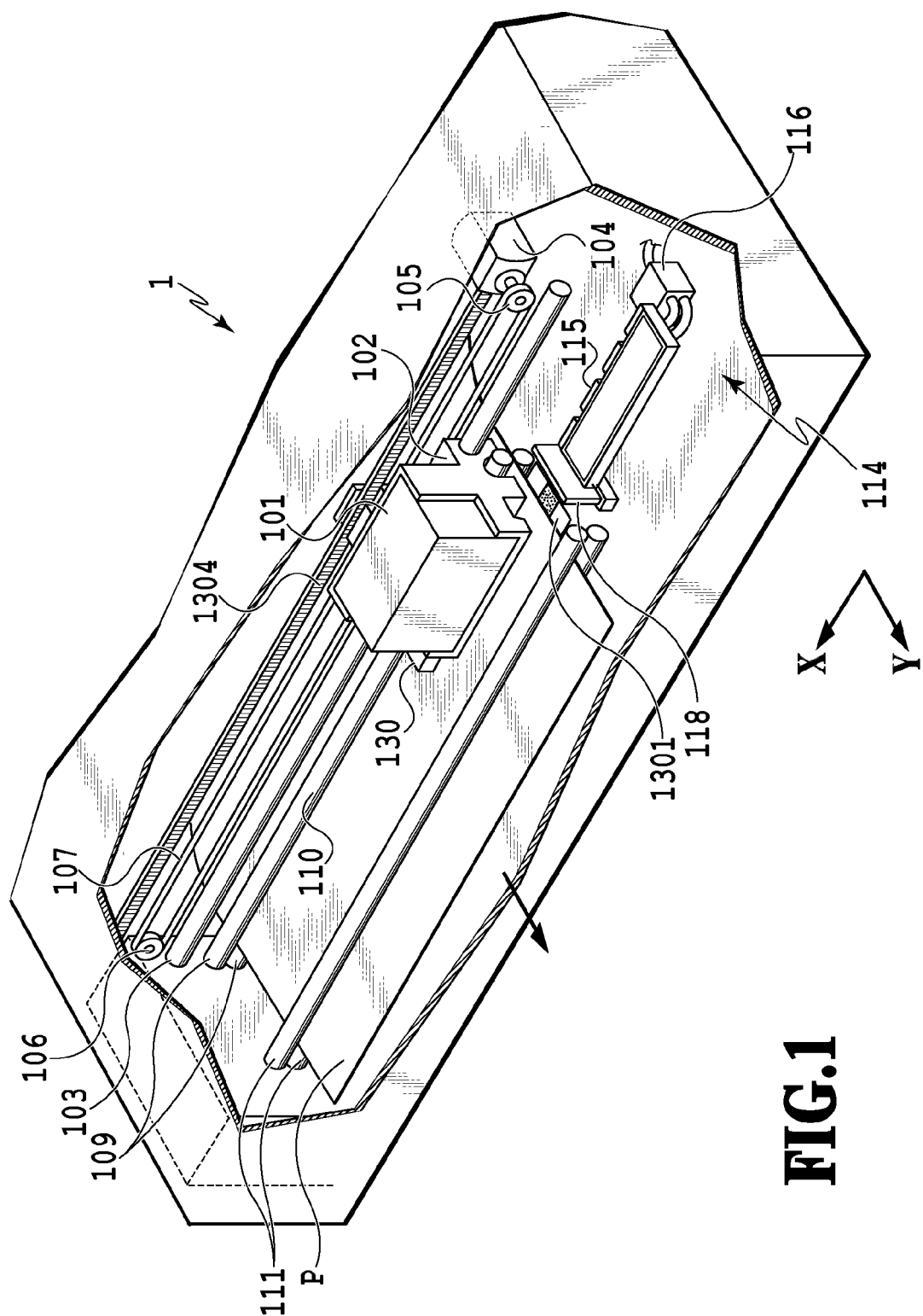
FIG. 1 is a schematic perspective view of an inkjet printing apparatus.

FIG. 1 is a schematic perspective view of an inkjet printing apparatus 1 (hereinafter, also referred to as the printing apparatus 1) to which the disclosure is applicable. A carriage 102 is capable of reciprocating in an X direction along a guide shaft 103 that extends in the X direction. The carriage 102 is driven by a main scanning motor 104 via a driving mechanism including a motor pulley 105, a driven pulley 106, a timing belt 107, and so on. An encoder 1304 detects the position of the carriage 102 moved in the X direction. A head cartridge 101 is mounted on the carriage 102 and a reflection-type optical sensor 130 is attached to a side portion of the carriage 102.

With rotations of two sets of conveyance roller pairs 109 and 111, a print medium P is conveyed in a Y direction crossing the scanning direction of the carriage 102. A platen 1301 is arranged at a position opposed to a downwardly-projecting ejection port surface (not illustrated in FIG. 1) of the head cartridge 101 and supports the print medium P being conveyed from the back side. The structure of the platen 1301 will be described later. The conveyance roller pairs 109 and 111 are part of a conveyance unit or a conveyor. The conveyor includes the conveyance roller pairs 109 and 111 and a conveying functionality provided by the CPU 901 (shown in FIG. 6) that performs the conveying operation.

A recovery treatment unit 114 for maintaining good ink ejection conditions in the head cartridge 101 is arranged at an end portion of a movable region of the head cartridge 101. The recovery treatment unit 114 is equipped with a cap 115 that caps the ejection port surface of the head cartridge 101, a suction pump 116, a wiper 118, and so on.

Figure 2B:
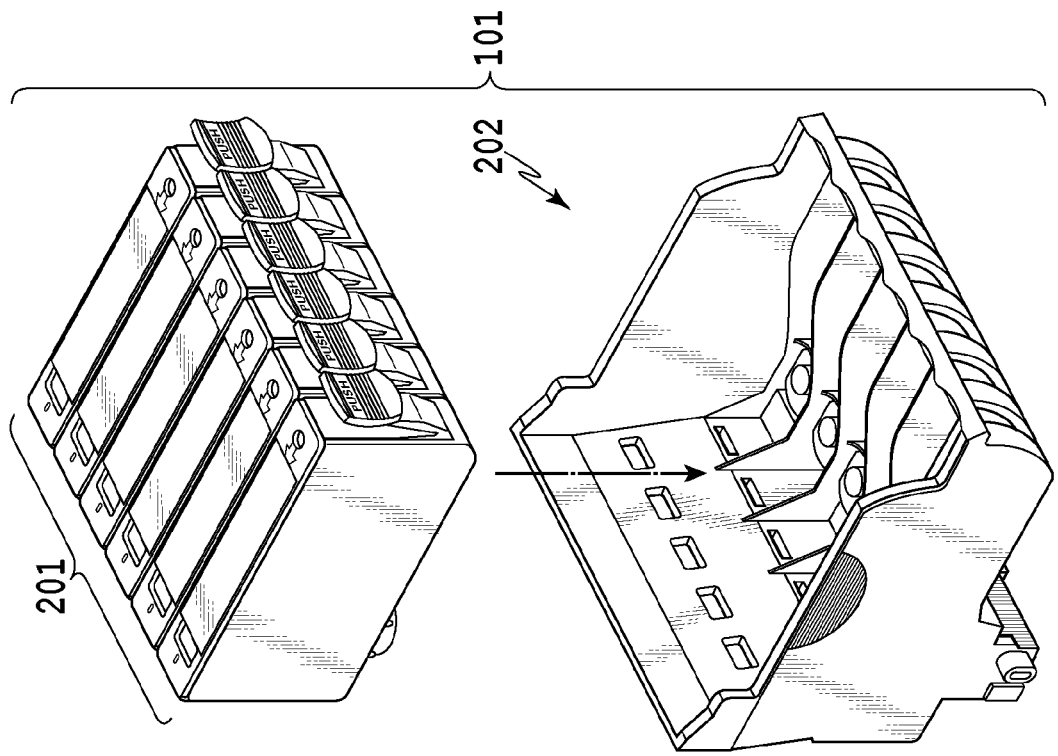
FIGS. 2A and 2B are perspective views illustrating a structure of a head cartridge.
Figure 2A:
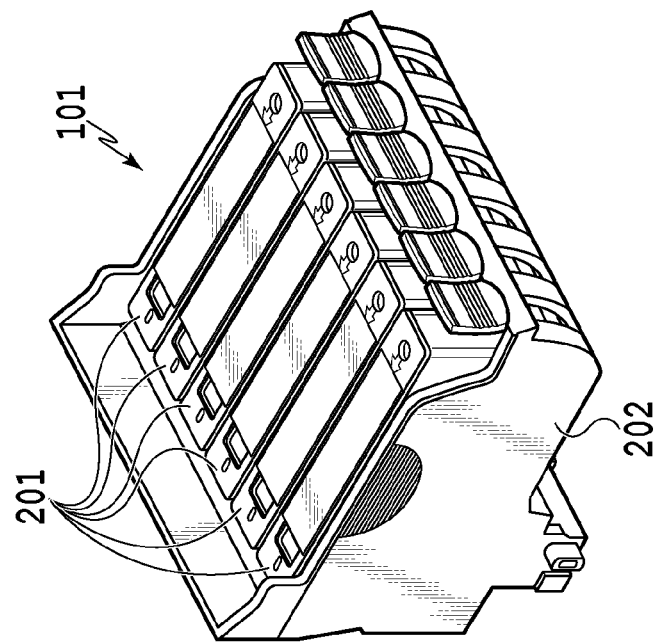

FIGS. 2A and 2B are perspective views illustrating the structure of the head cartridge 101. The head cartridge 101 includes ink tanks 201 that store inks and a print head 202 that ejects the inks supplied from the ink tanks 201. FIG. 2A illustrates a state where the ink tanks 201 are mounted on the print head 202 and FIG. 2B illustrates a state where the ink tanks 201 are not mounted on the print head 202. On the head cartridge 101 in the present embodiment, the ink tanks 201 of colors of black, light cyan, light magenta, cyan, magenta, and yellow are detachably mounted.

The print head 202 is an inkjet print head that ejects the inks by using thermal energy, and includes electric thermal conversion member. More specifically, the print head 202 boils the inks by using the thermal energy generated by the electric heat converters, and ejects the inks from its ejection ports to the print medium by using the bubble generating energy. Here, instead of using the electric heat converters, the print head 202 may use piezo elements or the like as elements for generating the ink ejection energy. The print head 202 is part of a printing unit or a printer which includes the print head 202 and a function performed by a processor or a programmable device such as the central processing unit (CPU) 901 shown in FIG. 6.

Figure 3B:
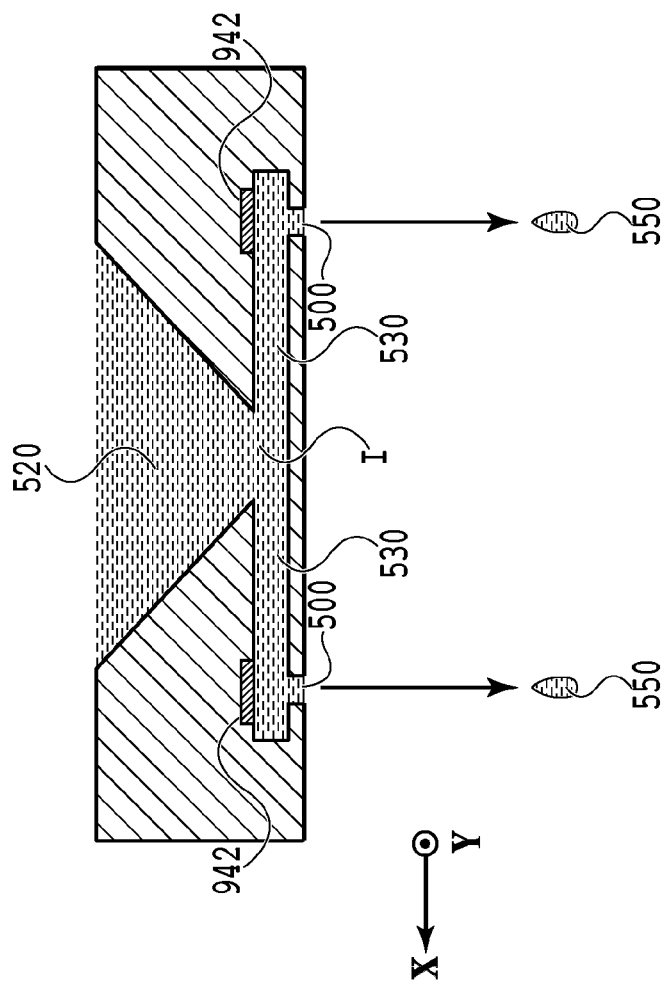
FIGS. 3A and 3B are diagrams illustrating a structure for one color in a print head.
Figure 3A:
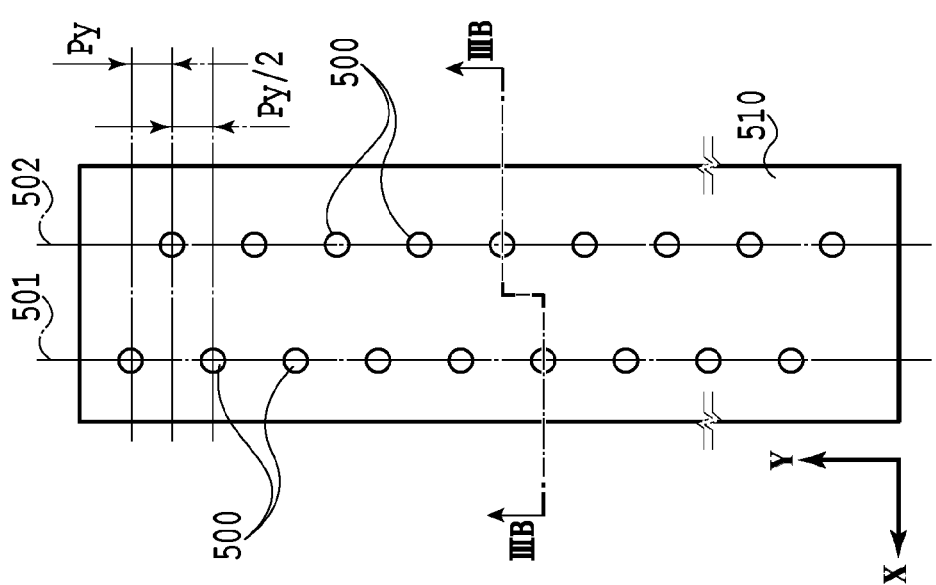

FIGS. 3A and 3B are diagrams illustrating a structure for one color in the print head 202. FIG. 3A illustrates an array structure of ejection ports 500 in an ejection port surface 510 and FIG. 3B illustrates a cross-sectional view taken along IIIB-IIIB.

As illustrated in FIG. 3A, multiple ejection ports 500 from which the ink is ejectable are arranged in two arrays 501 and 502 in the ejection port surface 510. The ejection port arrays 501 and 502 extend in a Y direction in which the print medium is conveyed. In each of the ejection port arrays 501 and 502, 384 ejection ports 500 are formed at pitches Py, specifically, at intervals each corresponding to 600 dpi. Then, the ejection ports 500 in the ejection port array 501 are shifted in the Y direction from the ejection ports 500 in the ejection port array 502 by a half pitch (Py/2) corresponding to 1200 dpi. From the totally 768 ejection ports 500 in the ejection port array 501 and the ejection port array 502, the ink of the same color is ejected, so that dots can be printed at a density of 1200 dpi in the Y direction.

As illustrated in FIG. 3B, a common channel 520 through which the ink is supplied to the ejection port array 501 and the ejection port array 502 is formed between the ejection port array 501 and the ejection port array 502. The ink in the common channel 520 is guided to each of the ejection ports 500 in the ejection port arrays 501 and 502 through an individual channel 530. In the individual channel 530, an ejection heater 942 formed of an electric heat converter is arranged at a position opposed to the ejection port 500. When the ejection heater 942 driven according to a drive signal generates thermal energy, the ink in the individual channel 530 causes film boiling, and the bubble generating energy at that time causes an ink droplet 550 to be ejected from the ejection port 500.

Figure 4:
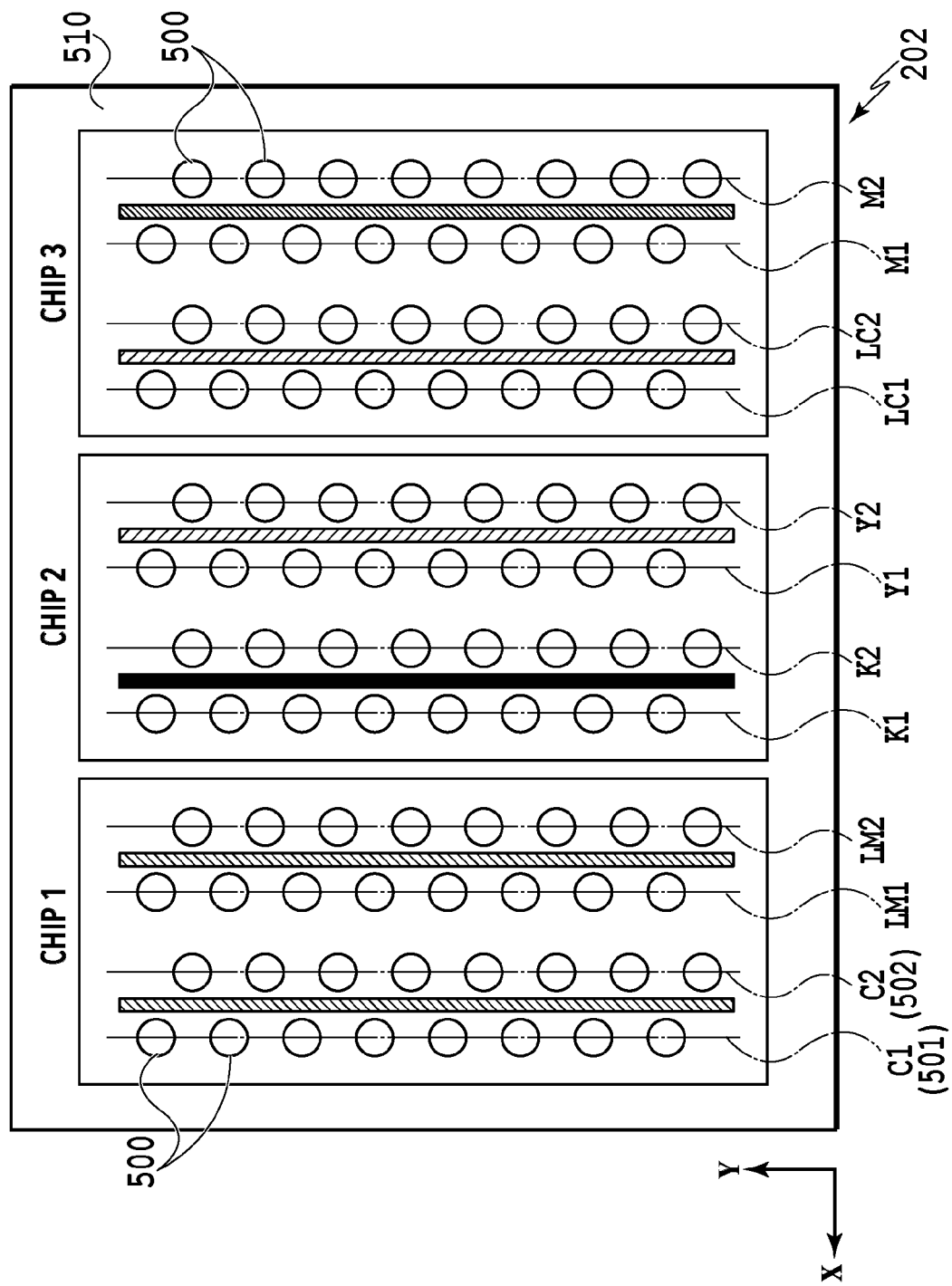
FIG. 4 is a diagram illustrating an array structure of ejection ports for six colors.

FIG. 4 is a diagram illustrating the array structure of the ejection ports 500 for six colors in the ejection port surface 510. The print head 202 in the present embodiment supports inks of six colors of cyan (C), magenta (M), yellow (Y), black (K), light cyan (LC), and light magenta (LM). In FIG. 4, C1 and C2 denote ejection port arrays for ejecting the ink of cyan (C) and LM1 and LM2 denote ejection port arrays for ejecting the ink of light magenta (LM). Then, K1 and K2 denote ejection port arrays for ejecting the ink of black (K) and Y1 and Y2 denote ejection port arrays for ejecting the ink of yellow (Y). Moreover, LC1 and LC2 denote ejection port arrays for ejecting the ink of light cyan (LC) and M1 and M2 denote ejection port arrays for ejecting the ink of magenta (M). The ejection port arrays C1, C2, LM1, and LM2 are provided in a common board (chip 1), the ejection port arrays K1, K2, Y1, and Y2 are provided in a common board (chip 2), and the ejection port arrays LC1, LC2, M1, and M2 are provided in a common board (chip 3).

The inks of cyan (C), magenta (M), yellow (Y), and black (K) are thick inks each having a relatively high dye concentration, while the inks of light cyan (LC) and light magenta (LM) are light inks each having a dye concentration of about one-sixth of those of the thick inks. By using the print head 202 in which the two ejection port arrays 501 and 502 for each color are arranged, color images having a resolution of 1200 dpi are printed on print media.

Figure 5:
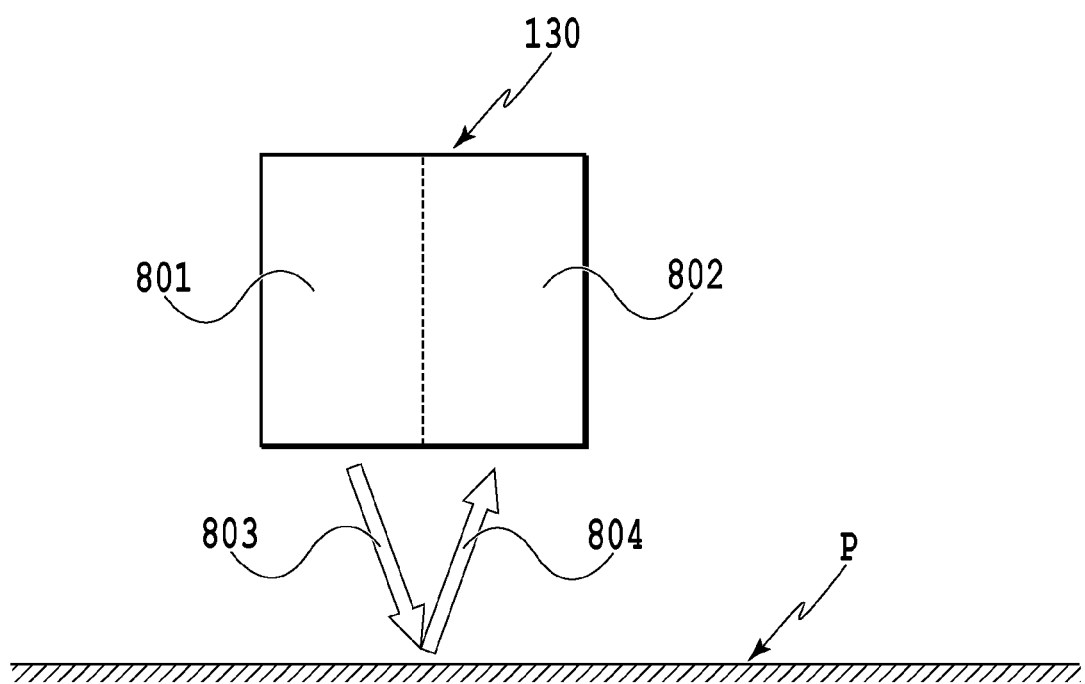
FIG. 5 is a schematic diagram illustrating a reflection-type optical sensor.

FIG. 5 is a schematic diagram for explaining the reflection-type optical sensor 130 (see FIG. 1) attached to the carriage 102. The reflection-type optical sensor 130 includes a light emitter 801 and a light receiver 802. Incident light 803 emitted from the light emitter 801 is reflected by a print medium P and then is detected by the light receiver 802. A detection signal (analog signal) of the light receiver 802 is transmitted to a control circuit on an electric board of the printing apparatus 1 through a flexible cable not illustrated, and is converted to a digital signal by an analog-to-digital (A/D) converter.

Figure 6:
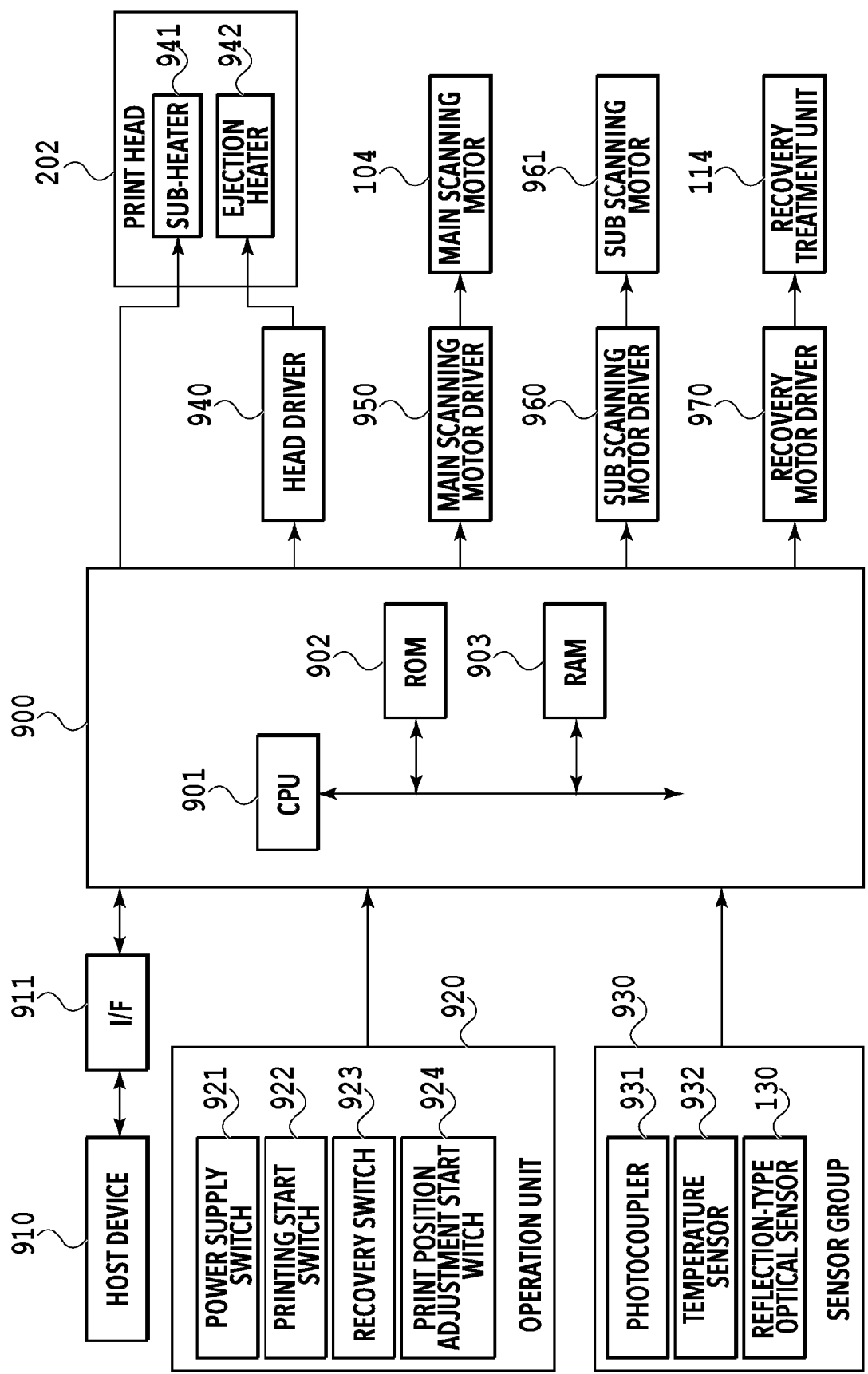
FIG. 6 is a block diagram illustrating an example of a structure for control.

FIG. 6 is a block diagram for explaining a structure for control in the inkjet printing apparatus. A controller 900 as a main controller includes, for example, a central processing unit (CPU) 901 in the form of a microcomputer, a read-only memory (ROM) 902 that stores programs, necessary tables, and other fixed data, and a random access memory (RAM) 903 on which an area for developing image data, a work area, and so on are provided. The CPU 901 performs operations by executing a function or a program stored in the ROM 902 or an equivalent memory device. The operations may include functionalities of a printing unit or printer, a scanning unit or scanner, and a conveyance unit or conveyor.

A host device 910 is a supply source of image data, and may be in the form of not only a computer that performs creation, processing, and the like of image data for printing, but also a reader or the like for image reading. The host device 910 transmits and receives image data, other commands, status signals, and so on to and from the controller 900 via an interface (I/F) 911.

An operation unit 920 is a switch group that accepts input of instructions by an operator, and includes a power supply switch 921, a printing start switch 922 for making an instruction to start printing, and a recovery switch 923 for making an instruction to activate a recovery operation for the print head 202. Moreover, the operation unit 920 includes a print position adjustment start switch 924 for starting a print position adjustment mode to be described later. In the present embodiment, execution of the print operation, the recovery operation for the print head 202, and the print position adjustment mode can be instructed through the switches in the operation unit 920. Instead, these operations may be executed based on instructions from the host device 910.

A sensor group 930 includes the reflection-type optical sensor 130 described with reference to FIG. 5, a photocoupler 931 for detecting a home position, a temperature sensor 932 provided at an appropriate position for detecting an environment temperature, and so on.

A head driver 940 is a driver that drives the ejection heaters 942 in the print head 202 according to print data or the like. The head driver 940 includes a shift register that aligns print data with the positions of the ejection heaters 942, a latch circuit that performs a latching action at an appropriate timing, and a logic circuit element that operates the ejection heaters 942 in synchronization with drive timing signals.

The print head 202 includes sub-heaters 941 for temperature adjustment of the ink before ejection in addition to the ejection heaters 942 described with reference to FIG. 3B. The sub-heaters 941 may be provided on the same board as the ejection heaters 942 or provided at a portion other than the board in the print head 202.

A main scanning motor driver 950 is a driver that drives the main scanning motor 104. A sub scanning motor driver 960 is a driver that drives a sub scanning motor 961 that rotates the conveyance roller pairs 109 and 111. A recovery motor driver 970 is a driver that operates the suction pump 116, the wiper 118, and so on in the recovery treatment unit 114.

Hereinafter, description will be given of a print position adjustment mode in the present embodiment.

Figure 7:
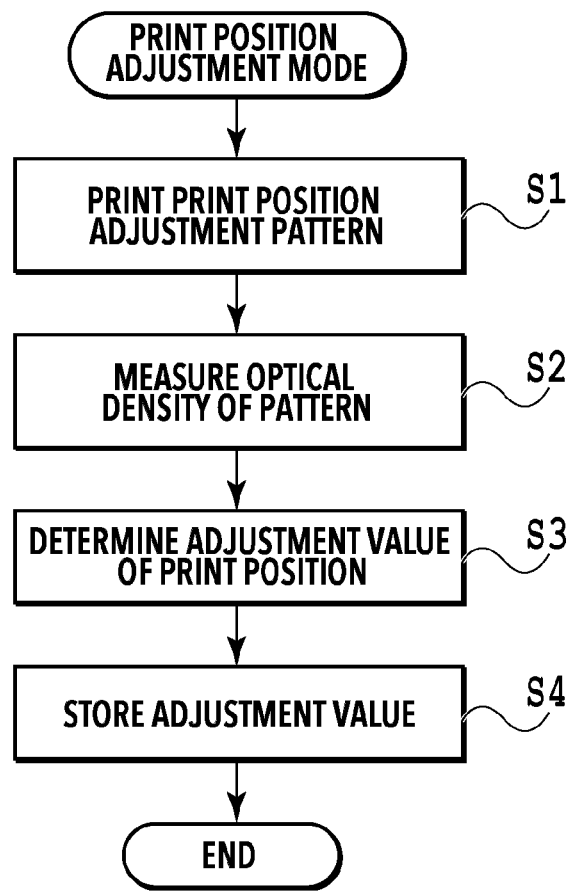
FIG. 7 is a flowchart of a print position adjustment mode.

FIG. 7 is a flowchart for explaining steps in processing of the print position adjustment mode in the present embodiment. This processing is processing that the CPU 901 executes according to a program stored in the ROM 902 by using the RAM 903 as a work area. This processing is started in the case where a user presses down the print position adjustment start switch 924 or a command for print position adjustment is inputted from the host device 910.

Upon start of this processing, the CPU 901 first executes adjustment pattern print processing for printing a predetermined adjustment pattern on a print medium P at S1. The adjustment pattern includes multiple patches for each of items for which the print positions are to be adjusted, which will be described in detail later.

At S2, the CPU 901 measures an optical density of each of the patches included in the adjustment pattern by using the reflection-type optical sensor 130.

At S3, the CPU 901 determines a print position adjustment value for each of the items based on the optical densities of the corresponding patches obtained at S2.

At S4, the CPU 901 stores the adjustment values determined at S3 in association with the respective items in the ROM 902. This processing is completed at the end of this step.

The adjustment values stored at S4 are used in following print operations, and enable the printing apparatus 1 to output an image having no print position misalignment.

Figure 8A:
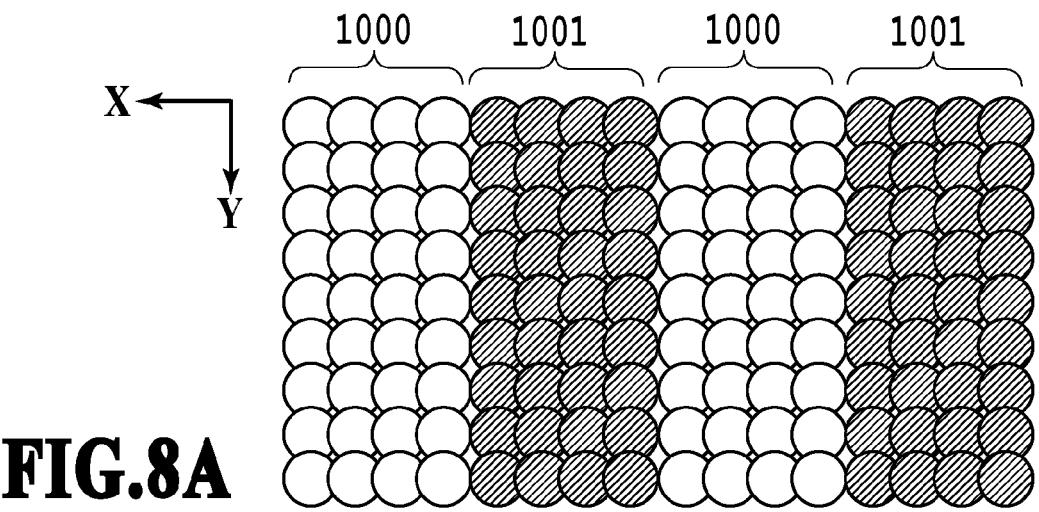
FIGS. 8A to 8C are diagrams illustrating an example of patches.
Figure 8B:
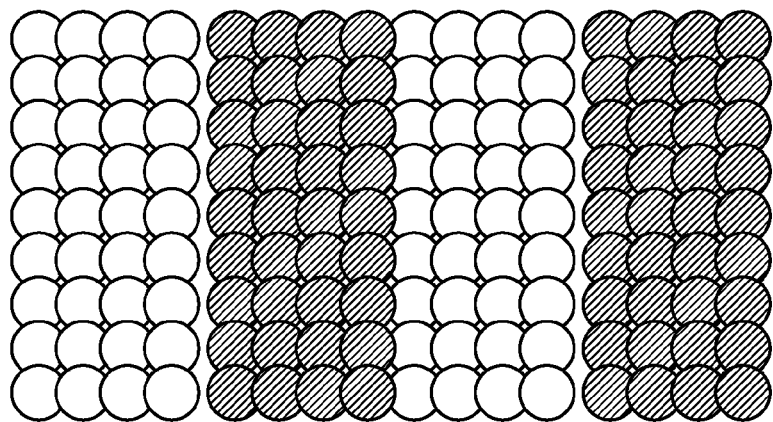
Figure 8C:
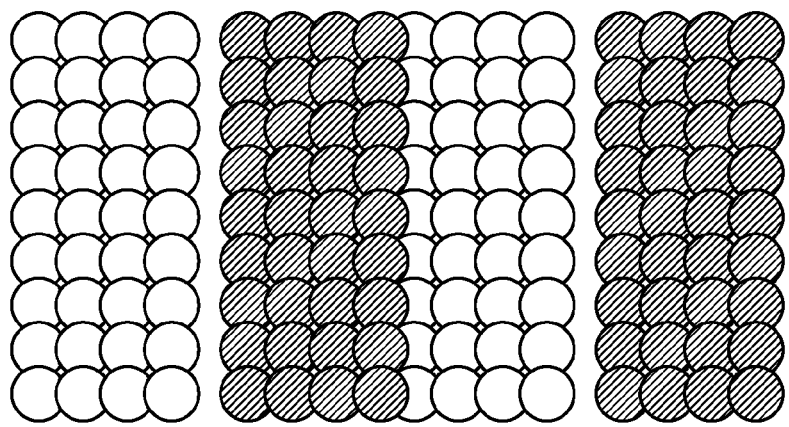

FIGS. 8A to 8C are diagrams illustrating an example of the patches printed at S1 in FIG. 7. Here, a case where an adjustment value is obtained for the print positions in the forward and backward scans as an item is described as an example. In the case of adjusting the print positions in the forward and backward scans, one patch includes a first dot group 1000 printed in the forward scan and a second dot group 1001 printed in the backward scan. In the present embodiment, each of the first dot group 1000 and the second dot group 1001 is a pattern in which four pixels where dots are printed consecutively and four pixels where any dots are not printed consecutively are alternately repeated in a main scanning direction. Then, at S1 in FIG. 7, multiple patches where a shift amount in the X direction between these two dot groups is gradually changed are printed on the print medium. More specifically, a timing for applying a voltage to the ejection heaters 942 to print the second dot group in the backward scan is shifted on a patch-by-patch basis relative to a timing for applying a voltage to the ejection heaters 942 to print the first dot group in the forward scan.

FIGS. 8A to 8C illustrate three patches among which the aforementioned ejection timings are different. FIG. 8A illustrates a state where the print positions of the first dot group 1000 and the second dot group 1001 are aligned with each other, in other words, the case where the ejection timing in the forward scan and the ejection timing in the backward scan are in favorable conditions. On the other hand, FIG. 8B illustrates a state where the second dot group 1001 is misaligned with the first dot group 1000 in the right direction and FIG. 8C illustrates a state where the aforementioned misalignment is further greater than in FIG. 8B.

Here, these three drawings are compared. In the case of the patch in FIG. 8A, all the dots are arranged at approximately equal intervals in the main scanning direction, and a coverage ratio of dots to a print medium (area factor) is approximately 100%. In contrast, in the case of the patch in FIG. 8B, portions where the sheet surface is exposed appear at boundaries between the first dot group 1000 and the second dot group 1001, and the area factor decreases as compared with FIG. 8A. In FIG. 8C having the greater misalignment than in FIG. 8B, the area factor further decreases. In FIGS. 8B and 8C, portions where the density increases as compared with FIG. 8A due to overlapping of dots are also generated, but the decrease in the area factor has a greater influence on the optical density than the dot overlapping has. For this reason, in the case of measuring the densities of the entire patches, the optical density decreases in the order of the patch in FIG. 8A, the patch in FIG. 8B, and the patch in FIG. 8C, that is, in ascending order of the misalignment.

Figure 9:
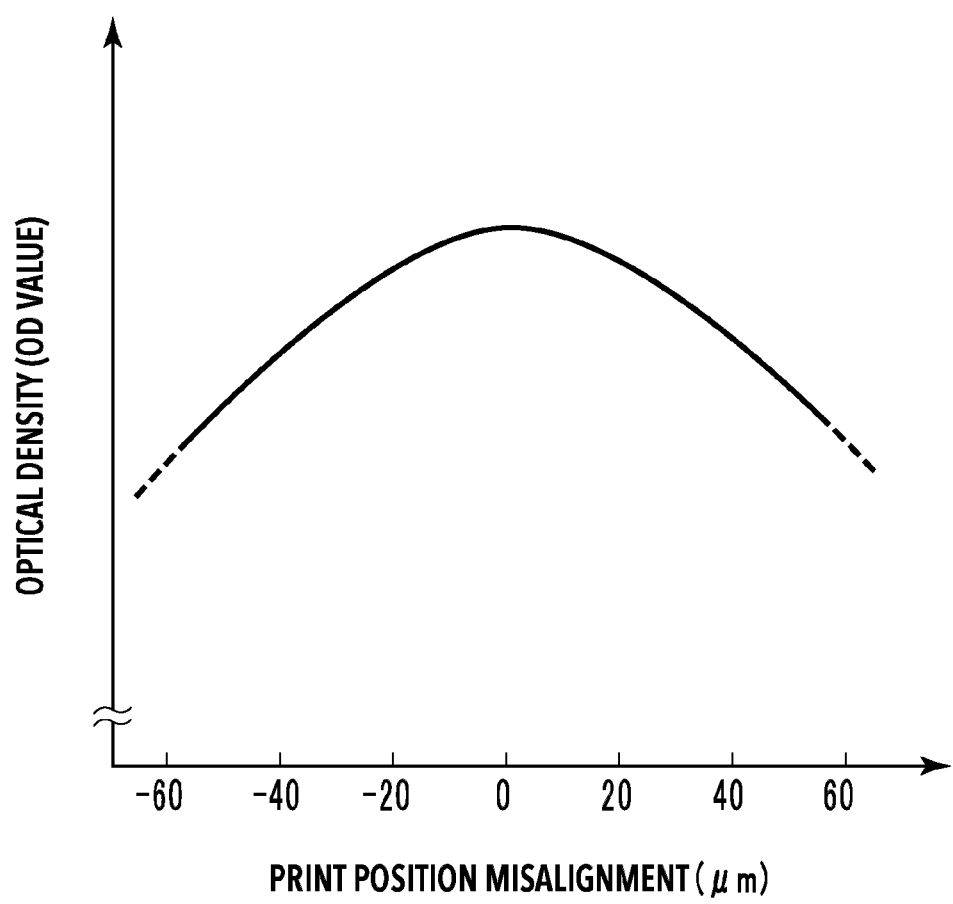
FIG. 9 is a diagram illustrating a relation between print position misalignment and an optical density.

FIG. 9 is a diagram illustrating a relation between the print position misalignment and the optical density. The horizontal axis indicates the misalignment of the second dot group 1001 relative to the first dot group 1000 in a patch, and the vertical axis indicates the optical density of the patch. The optical density is a detected density D obtained by using the reflection-type optical sensor 130 described with reference to FIG. 5.

Here, in the case where Iin denotes the intensity of the incident light 803 and Iref denotes the intensity of the reflected light 804 in FIG. 5, the reflectance R is $R = I\text{ref}/I\text{in}.$ The detected density D is a logarithmic function of the reciprocal of the reflectance R, and can be calculated in accordance with the following equation using the reflectance R.

$D = \text{Log}_{10}(1/R)$

If the misalignment between the print position in the forward scan and the print position in the backward scan is 0 μm, the area factor on the print medium is approximately 100% as in FIG. 8A and the detected density is the highest value. Then, as the misalignment between the print positions in any of the right and left directions increases, the area factor decreases and accordingly the detected density becomes lower. At S3 in FIG. 7, the CPU 901 compares the detected densities of the patches with each other, and determines the print position in the patch with the highest detected density as the adjustment value.

Figure 10:
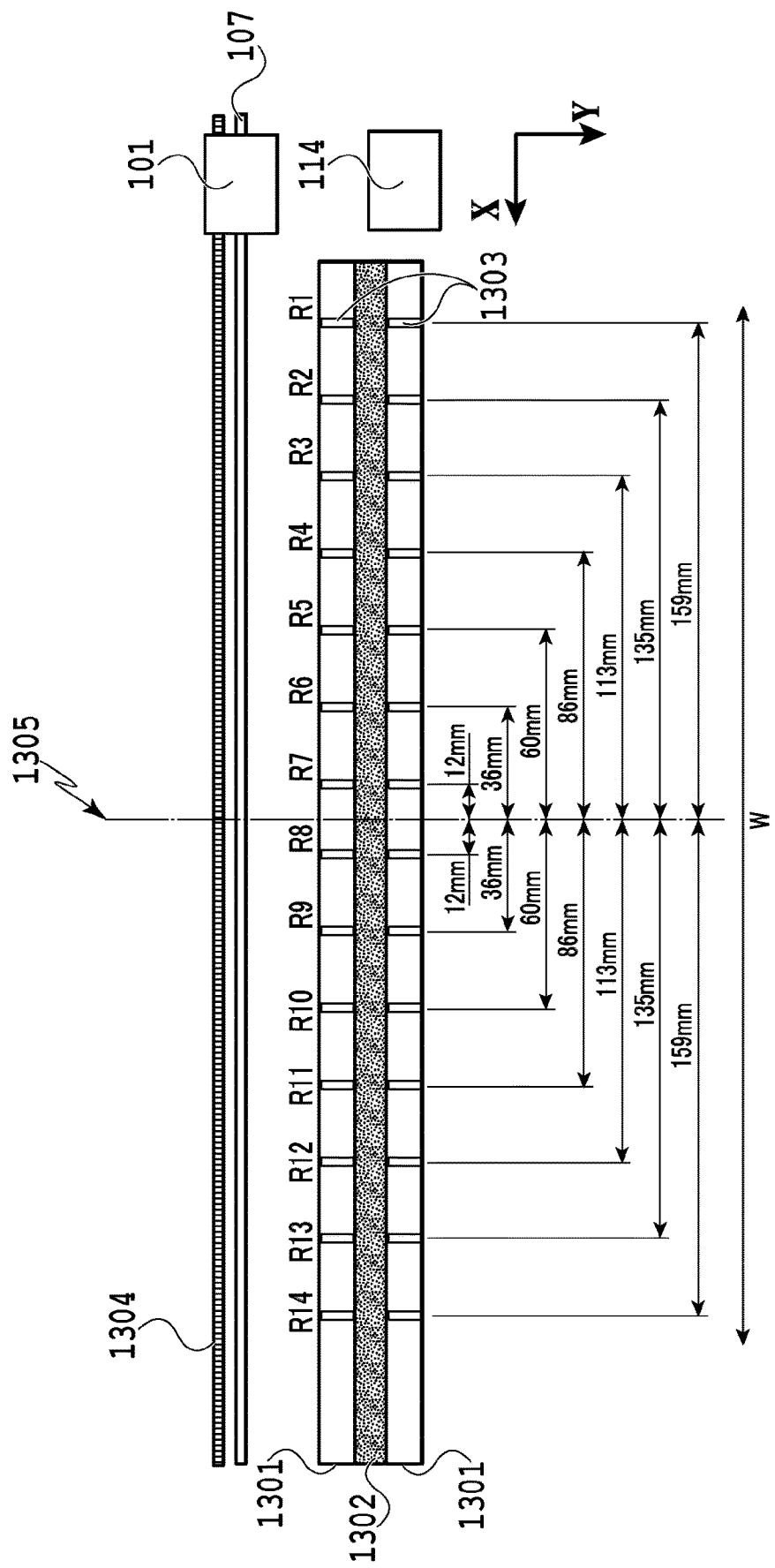
FIG. 10 is a top view illustrating a layout of platen ribs.

FIG. 10 is a top view illustrating a layout of platen ribs 1303 in a platen 1301 that extend in the X direction. Although a scanning region of the head cartridge 101 is actually right above the platen 1301, the scanning region is shifted in the Y direction in FIG. 10 for the purpose of explaining the positional relationship between them in the X direction.

The position of the head cartridge 101 in the X direction during a printing scan is managed by the encoder 1304. FIG. 10 illustrates a state where the head cartridge 101 is located at the recovery treatment unit 114 outside a printable region W where the head cartridge 101 can actually print images.

The platen 1301 is a plate that extends in the X direction. The platen 1301 is provided in two rows at a predetermined interval in the Y direction, and an ink absorber 1302 for absorbing the ink flowing out of the edges of a print medium during a print operation is provided between the two rows of the platen 1301. On the platen 1301, multiple platen ribs 1303 projecting upward are formed at predetermined pitches in the X direction. More specifically, these platen ribs 1303 are arranged on a conveyance route of the print medium and support the print medium being conveyed from the back side. The position of each of the platen ribs 1303 in the X direction is managed in association with a coordinate in the encoder 1304.

The platen ribs 1303 are arranged symmetrically with respect to a center line 1305 of the printable region W. For convenience, R1 denotes the platen rib 1303 located closest to the recovery treatment unit 114 and R2, R3, . . . , R14 denote the platen ribs 1303 in ascending order of the distance from the recovery treatment unit 114. FIG. 10 indicates the distance between the center line 1305 and each platen rib 1303.

The print medium P being conveyed on the platen ribs 1303 in the Y direction is conveyed with the center of the print medium P aligned with the center line 1305 irrespective of the size of the print medium. The layout of the platen ribs 1303 is determined depending on the size of a print medium supposed to be conveyed and the rib pitches between the two neighboring platen ribs 1303 are not constant. For example, in the case where a print medium is in A4 size, the print medium is conveyed in the Y direction at an internal position between the platen ribs 1303 of R3 and R12 while being supported by the eight platen ribs 1303 of R4 to R11.

Figure 11:
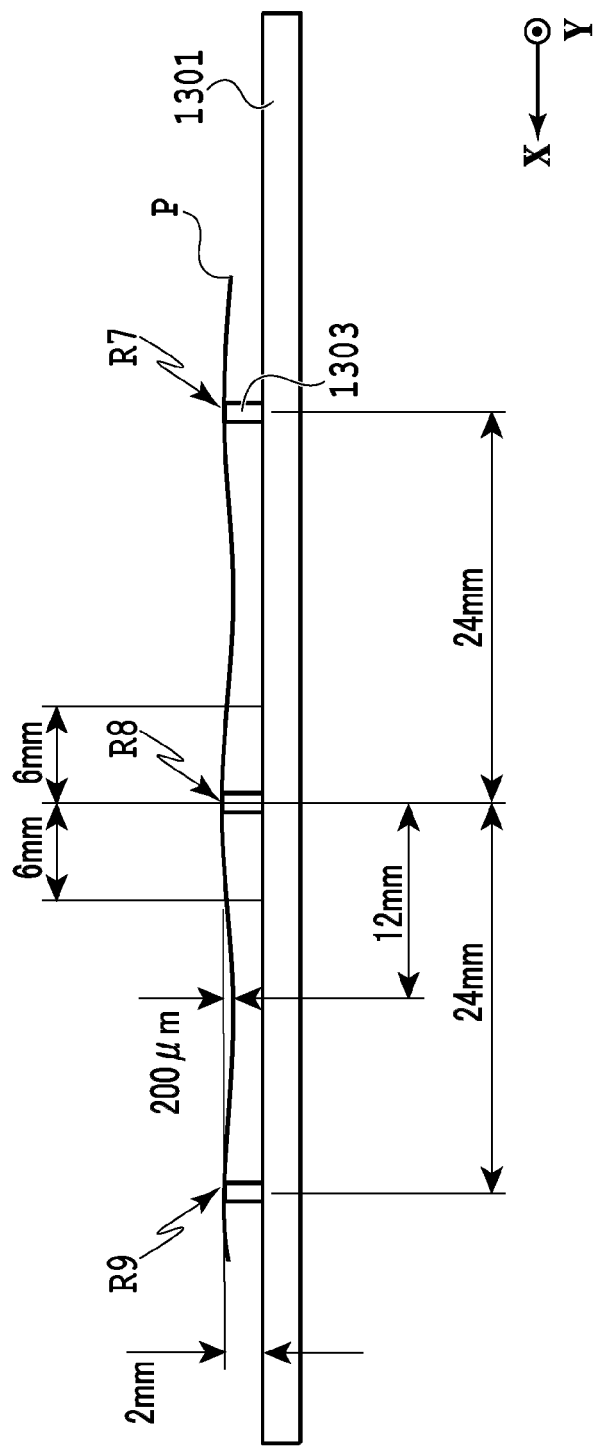
FIG. 11 is a diagram illustrating a state where three platen ribs support a print medium.

FIG. 11 is a diagram illustrating a state where the three platen ribs 1303 of R7, R8, and R9 support a print medium P being conveyed. The platen ribs 1303 have a height of approximately 2 mm, and their tip ends come into contact with the back side of the print medium P and thereby support the print medium P. The pitch between R7 and R8 and the pitch between R8 and R9 are both 24 mm.

In the print medium P, a portion supported by each of the platen ribs 1303 is in an upwardly-projecting form and a portion between the two platen ribs 1303 is in a recessed form. Here, an intra-sheet maximum variation is defined as a difference between the projecting portion and the lowest point of the recessed portion. This intra-sheet maximum variation in a print medium having a low stiffness such as a plain sheet, for example, is approximately 200 μm. In other words, a distance between the ejection port surface of the print head 202 and the print medium P (a head-to-paper distance) has a variation of 200 μm in the X direction.

Figure 12B:
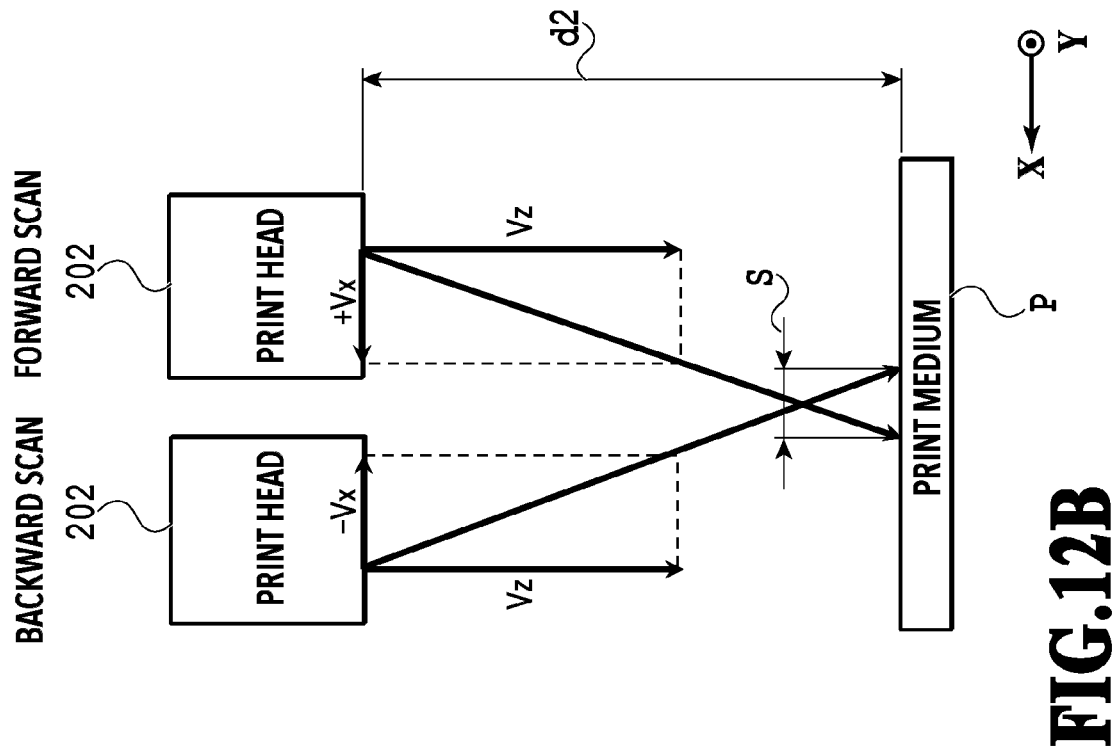
FIGS. 12A and 12B are diagrams illustrating print position misalignment between the forward scan and the backward scan due to a difference in a head-to-paper distance.
Figure 12A:
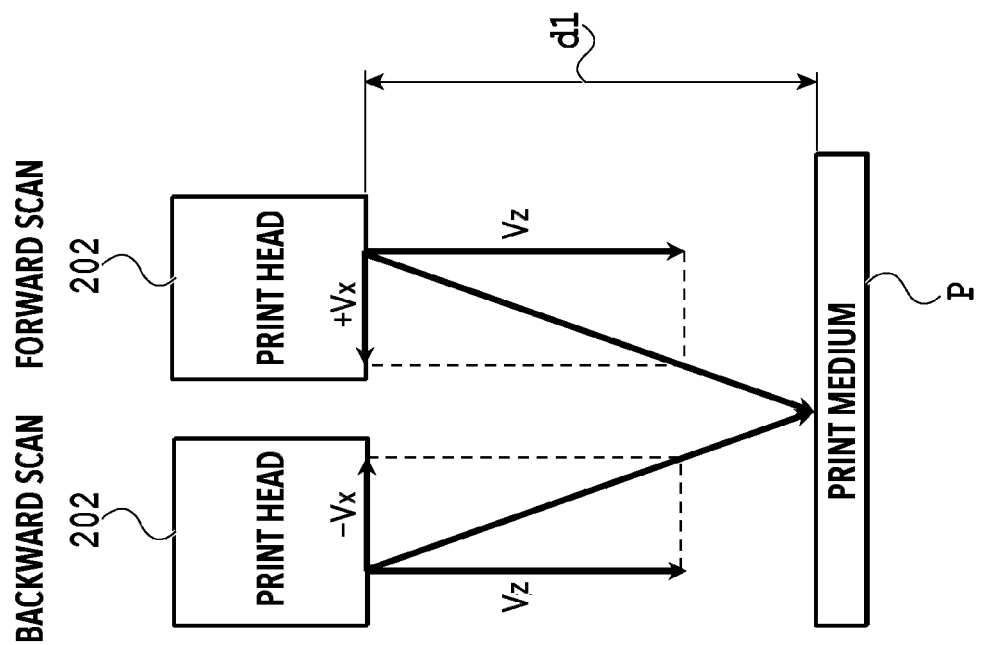

FIGS. 12A and 12B are diagrams for explaining print position misalignment between the forward scan and the backward scan due to a difference in the head-to-paper distance. In the forward scan, the print head 202 ejects the ink to the print medium P at an ejection velocity Vz while moving at a velocity Vx in the +X direction. In this ejection, an ink droplet ejected also has the velocity Vx in the +X direction and is landed to form the dot at a position shifted in the +X direction from the position where the print head 202 ejects the ink droplet. On the other hand, in the backward scan, the print head 202 ejects the ink to the print medium P at the ejection velocity Vz while moving at the velocity Vx in the −X direction. In this ejection, an ink droplet ejected also has the velocity −Vx in the −X direction and is landed to form the dot at a position shifted in the −X direction from the position where the print head 202 ejects the ink droplet.

FIG. 12A illustrates a state where the position of the ink landed in the forward scan and the position of the ink landed in the backward scan coincide with each other with a head-to-paper distance d1. On the other hand, FIG. 12B illustrates a case where ejection actions are performed with a head-to-paper distance d2 (>d1) at the same timings as in FIG. 12A. In the case of FIG. 12B, in proportion to the increase in the head-to-paper distance, a time from the ejection to the landing of the ink droplet increases, and accordingly the traveling distance in the X direction also increases. For this reason, even though the ejection actions are performed at the same timings as in FIG. 12A, the dot printed in the forward scan and the dot printed in the backward scan are formed at different positions and thus a misalignment with a distance s occurs between the two dots.

Figure 13B:
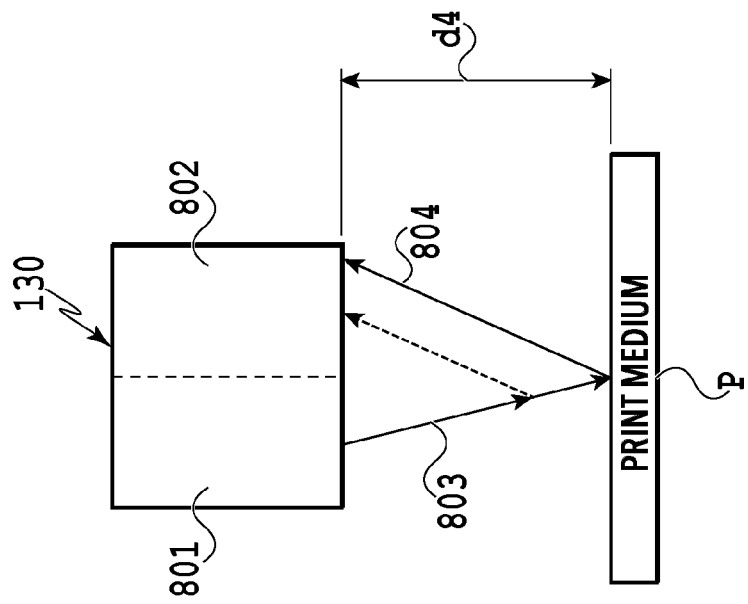
FIGS. 13A and 13B are diagrams illustrating an influence of a difference in the head-to-paper distance on the detection accuracy of a reflection-type optical sensor.
Figure 13A:
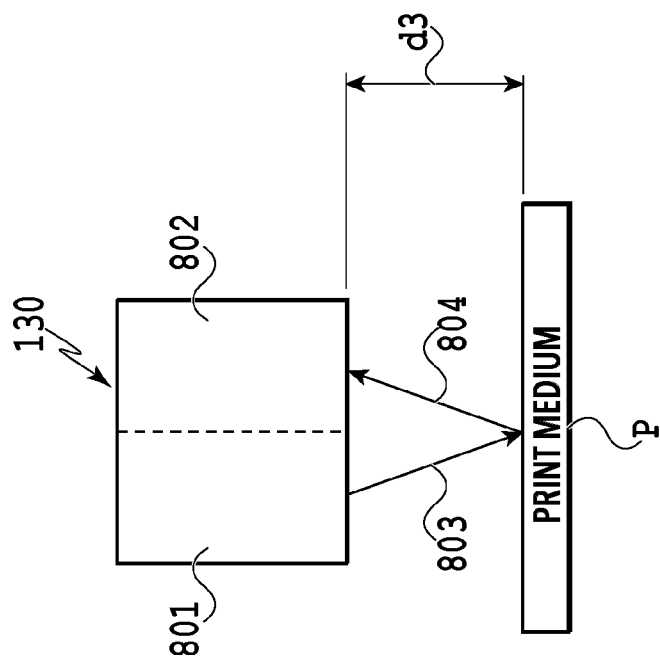

FIGS. 13A and 13B are diagrams illustrating an influence of a difference in the head-to-paper distance on the detection accuracy of the reflection-type optical sensor 130. FIG. 13A illustrates a case where an optical density of the print medium P is measured under the condition that a distance between the reflection-type optical sensor 130 and the print medium P is d3. The incident light 803 emitted from the light emitter 801 is reflected by the print medium P and the reflected light 804 is incident on the substantially center of the light receiver 802. On the other hand, FIG. 13B illustrates a case where an optical density of the print medium P is measured under the condition that the distance between the reflection-type optical sensor 130 and the print medium P is d4 (>d3). Due to the longer distance between the reflection-type optical sensor 130 and the print medium P, the reflected light 804 is shifted in the X direction and is incident on an edge portion of the light receiver 802. Thus, even if the measurement is performed on the same image, the optical density detected by the reflection-type optical sensor 130 varies between FIGS. 13A and 13B.

As discussed above, a variation of the head-to-paper distance illustrated in FIG. 11 is a factor that reduces the accuracy of the print positions and the measurement accuracy of the optical density. In other words, in the print position adjustment mode in the present embodiment in which multiple patches are printed and the optical density of each of the patches is measured, the head-to-paper distance at each of the positions on the print medium where the multiple patches are arranged is required to be stable in the process of conveying the print medium. From this point of view, it can be said that the printing of multiple patches in association with the respective platen ribs as in Japanese Patent Laid-Open No. 2010-143123 is effective for maintaining the accuracy of the print position adjustment.

However, if all the patches necessary for adjustment are arranged above the platen ribs 1303, a print medium in, for example, A4 size allows only eight patches above R4 to R11 to be arranged in the X direction (see FIG. 10). Meanwhile, the inkjet printing apparatus 1 requires print position adjustments for various items including not only the above-described print positions in the forward and backward scans, but also the print positions of the inks of different colors (see FIG. 6), the print positions of the ejection port arrays (see FIG. 3A), and so on. Under such circumstances, printing of all the patches for all the items on a print medium or print media requires a print medium in a large size having no versatility or consumes multiple print media for the print position adjustment mode, which is unfavorable in terms of the usability.

In view of the above circumstances, the present inventors considered that it is effective to confirm in advance ranges on both sides of each platen rib 1303 where the influence of the print position misalignment due to a variation of the head-to-paper distance is tolerable and to arrange a plurality of the above patches within the confirmed ranges. Then, in the case of FIG. 11, the studies by the present inventors confirmed that a variation of the head-to-paper distance within a range of 25% of the distance from R8 to R7 or R9, specifically, within a 6 mm area on either of the right and left sides is kept as low as approximately 100 µm, which is half of the intra-sheet maximum variation of 200 µm. If the variation of the head-to-paper distance is kept as low as 100 µm, the influence on the accuracy of the print position adjustment is only at a level of several µm and the influence on image quality in the inkjet printing apparatus of the present embodiment that prints images at a print resolution of 1200 dip can be kept within a tolerable range. Thus, in the print position adjustment mode of the present embodiment, one patch is printed within a 6 mm area on one side of the platen rib 1303 and another patch having a shift amount different from that in the former patch is printed within a 6 mm area on the other side of the platen rib 1303. As a result, the number of patches printable in the width direction of the print medium can be increased as compared with a case in the related art.

To this end, the present inventors first confirmed the size of a patch necessary to normally measure the optical density.

FIGS. 14A and 14B are diagrams each depicting a relation between one patch 1700 and a spot diameter 1702 of the incident light 803 of the reflection-type optical sensor 130 (see FIG. 5) on a print medium. In order to measure the density of the patch accurately, it is desirable that the spot diameter 1702 be within the area of the patch 1700 as in FIG. 14A for the following reason. If the spot diameter 1702 protrudes from the area of the patch 1700 as illustrated in FIG. 14B, the detected density tends to be affected by a variation of the light incident position, and may not have the clear maximum value as illustrated in FIG. 9. Thus, in the present embodiment, the spot diameter of the incident light 803 is narrowed by a lens not illustrated, and the size of the patch in the X direction is set to 4.7 mm, which is the size to which the spot diameter thus narrowed can be fully confined. This makes it possible to arrange two patches next to each other within the 6 mm areas on both sides of one platen rib 1303.

FIGS. 15A and 15B are views illustrating a layout of patches in the X direction in the print position adjustment mode of the present embodiment. FIG. 15A depicts an overall view in the X direction and FIG. 15B depicts an enlarged view of an area around the rib R4. Here, an adjustment pattern for adjusting the print positions in the forward scan and the print positions in the backward scan by using a print medium P in A4 size is illustrated as an example. In FIGS. 15A and 15B, 13 patches are illustrated with reference signs of 1401 to 1413, respectively.

As illustrated in FIG. 15B, the patch 1401 and the patch 1402 are arranged next to each other on both sides of the platen rib 1303 of R4, and the two patches 1401 and 1402 each have a width of 4.7 mm in the X direction, that is, totally have a width of 9.4 mm in the X direction. Thus, these two patches are confined to the 6 mm areas on the right and left sides of the platen rib 1303, and therefore can be used favorably for the print position adjustment under the condition that a variation of the head-to-paper distance is in a tolerable range. In the present embodiment, such a patch set is printed in association with each of the platen ribs 1303 of R5 to R9. In FIG. 15A, the leftmost patch 1413 is arranged right above the platen rib 1303 of R10.

In the present embodiment, the relative print position of the first dot group 1000 printed in the forward scan and the second dot group 1001 printed in the backward scan (see FIG. 8) is gradually changed in the arrangement order of the patches. For example, for the center patch 1407, the first dot group 1000 and the second dot group 1001 are printed with the ejection timings in the forward scan and the backward scan matched each other according to the design. Then, the ejection timing is changed gradually from that of the center patch 1407 such that the ejection timing in the backward scan is advanced more as the patch is located closer to the leftmost and the ejection timing in the backward scan is delayed more as the patch is located closer to the rightmost. However, the relation between the arrangement order and the ejection timings of the patches is not limited to the above. For example, the patches with the most-advanced and most-delayed ejection timings in the backward scan may be arranged next to each other in the vicinity of the same platen rib 1303.

Figure 16:
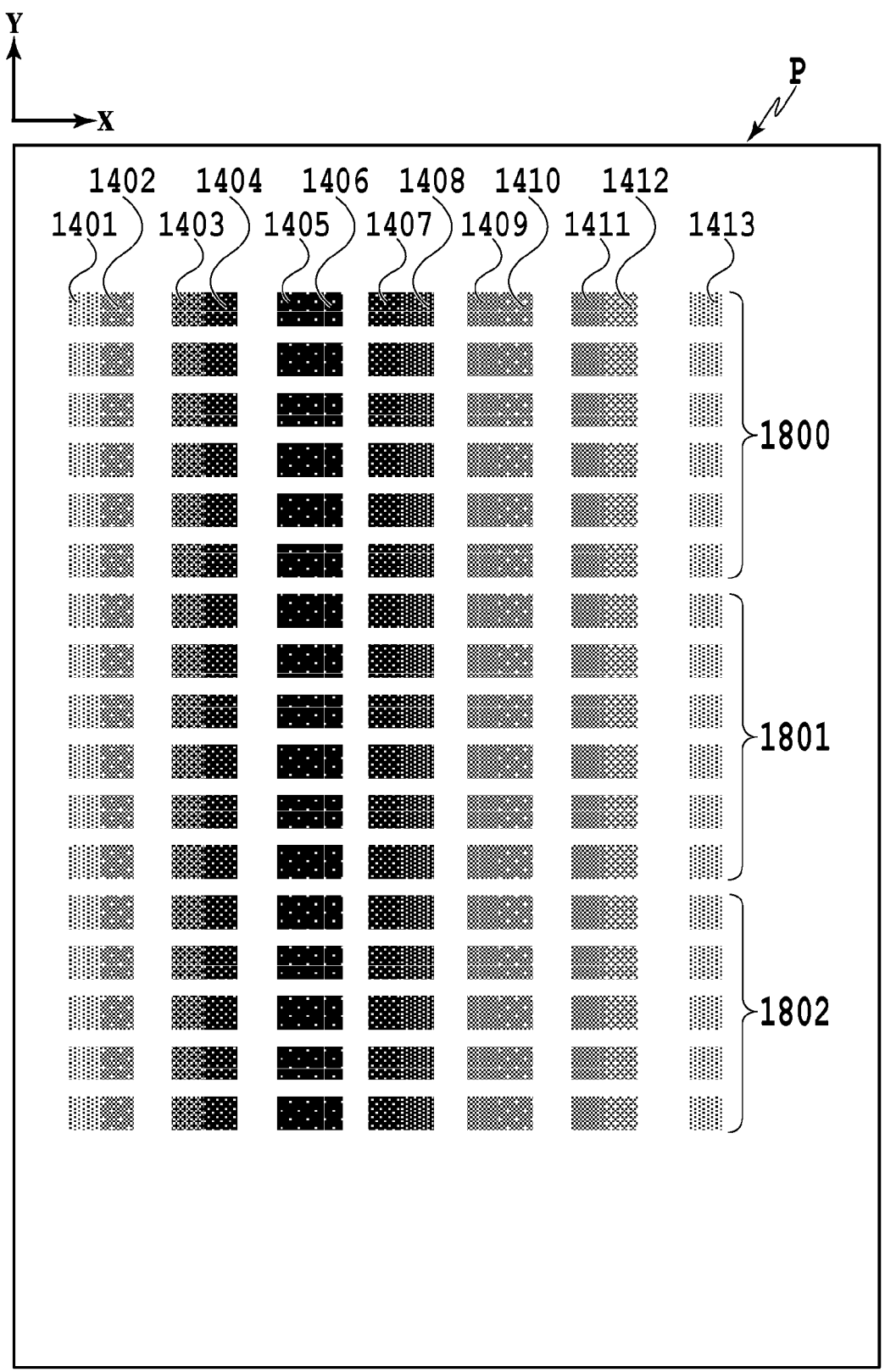
FIG. 16 is an overall view of an adjustment pattern in a first embodiment.

FIG. 16 is an overall view of an adjustment pattern printed in the print position adjustment mode of the present embodiment. The adjustment pattern in the present embodiment includes a first pattern 1800 for adjusting the print positions in the forward and backward scans, a second pattern 1801 for adjusting the print positions of the ejection port arrays of the same color, and a third pattern 1802 for adjusting the print positions of the ejection port arrays of different colors. Then, all of these patterns are printed on one print medium P in A4 size.

Hereinafter, each of the patterns will be briefly described. The first pattern 1800 is a pattern for adjusting the print positions in the forward scan and the backward scan. Six rows each including 13 patches arrayed in the X direction as described with reference to FIG. 15 are printed in Y direction for the respective inks of six colors. The second pattern 1801 is a pattern for adjusting the print positions of the ejection port arrays that eject the ink of the same color, such as the ejection port arrays 501 and 502 in FIG. 3A. Six rows each including 13 patches in which the shift amount between the dot group printed by the ejection port array 501 and the dot group printed by the ejection port array 502 is gradually changed are printed in Y direction in association with the respective inks of six colors. The third pattern 1802 is a pattern for adjusting the print positions of the ejection port arrays that eject the inks of different colors as illustrated in FIG. 4. For example, five rows each including 13 patches in which the shift amount between the dot group printed by the ejection port arrays of the reference color (K1) and the dot group printed by the ejection port arrays of an adjustment color (C1) is gradually changed are printed in Y direction in association with the respective five adjustment colors.

Thus, according to the present embodiment, all of the 221 patches included in the three patterns can be placed on one print medium in A4 size. In other words, it is possible to execute the print position adjustment mode with high accuracy while saving consumption of print media.

Although the present embodiment is described on the assumption that the patches are printed within the 6 mm areas on both sides of the platen rib 1303 in order to limit the influence due to a variation of the head-to-paper distance to the tolerable range, such areas can be changed as appropriate as a matter of course. The degree of variation of the head-to-paper distance also varies depending on the type of the print medium, use environment, the width of the platen rib 1303, and so on. Moreover, even with the same degree of the print position misalignment, the influence on an image changes depending on whether the image is a text image or a photograph image or depending on the print resolution of the image or the like. For the reasons discussed above, the patch printable areas on both sides of the platen rib 1303 may be adjusted as appropriate depending on these various kinds of information.

Second Embodiment

Figure 17:
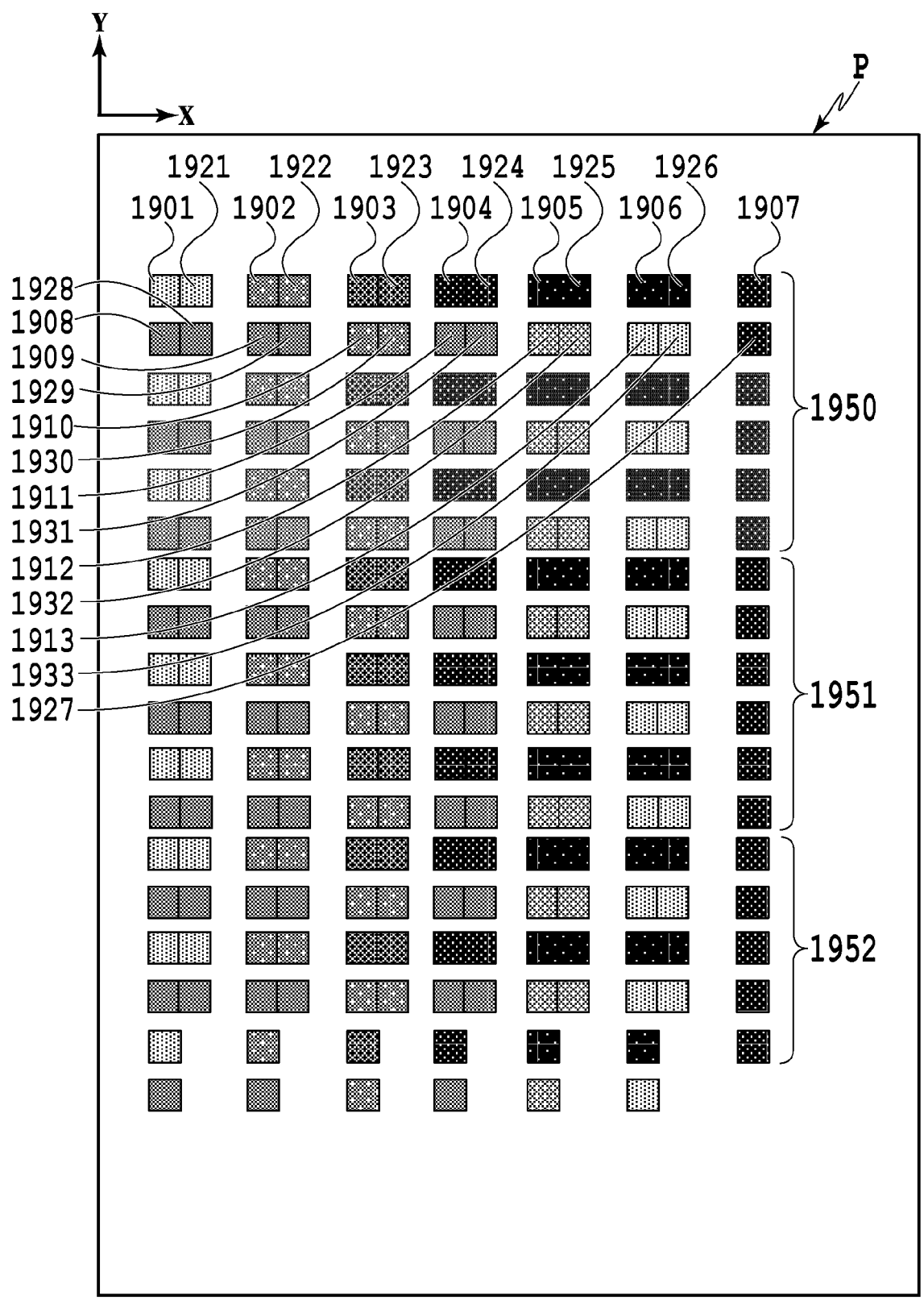
FIG. 17 is an overall view of an adjustment pattern in a second embodiment.

FIG. 17 is an overall view of an adjustment pattern to be used in the print position adjustment mode of the present embodiment. The adjustment pattern of the present embodiment also includes a first pattern 1950 for adjusting the print positions in the forward and backward scans, a second pattern 1951 for adjusting the print positions of the ejection port arrays of the same color, and a third pattern 1952 for adjusting the print positions of the ejection port arrays of the different colors. Then, all of these patterns are printed on one print medium P in A4 size.

A difference of the adjustment pattern in the present embodiment from that in the first embodiment is a combination of two patches above the same platen rib 1303. For example, in the present embodiment, patches 1901 to 1913 are patches for adjusting the print positions in the forward and backward scans for the cyan ink. Then, patches 1921 to 1933 are patches for adjusting the print positions in the forward and backward scans for the light cyan ink. In other words, in the present embodiment, two patches arranged above the same platen rib 1303 are patches printed by different colors, that is, by different ejection port arrays. The same applies to the second pattern 1951 and the third pattern 1952.

According to the disclosure, the ejection port arrays can be driven at more dispersed locations in the print medium P than in the first embodiment. This makes it possible to print the adjustment pattern while maintaining the stable ejection conditions of the respective ejection port arrays, and thereby to further enhance the adjustment accuracy.

Third Embodiment

In the print position adjustment mode of the present embodiment, coarse adjustment of the print positions is performed prior to the print position arrangement processing described in the first embodiment.

Figure 18:
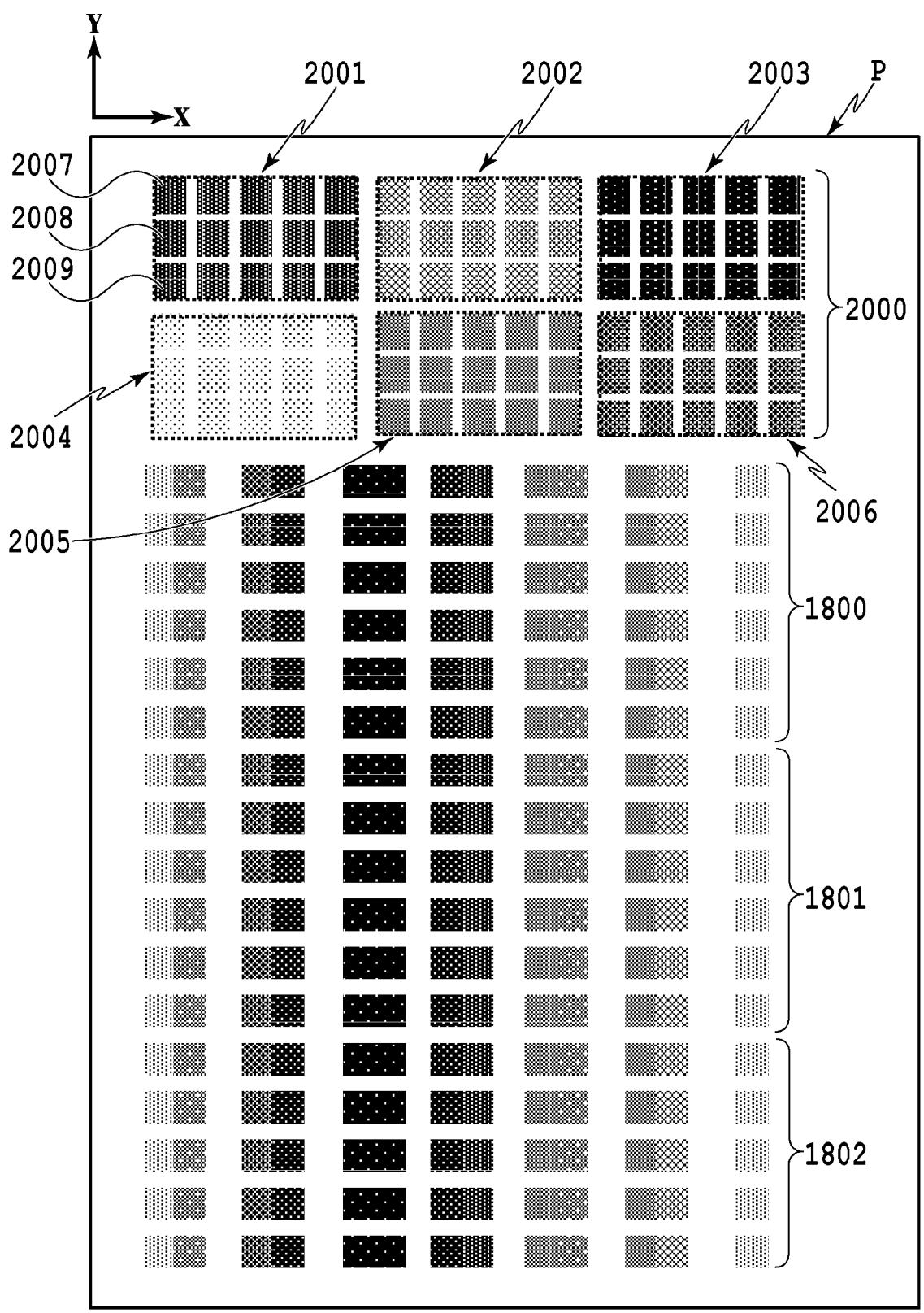
FIG. 18 is an overall view of an adjustment pattern in a third embodiment.

FIG. 18 is an overall view of an adjustment pattern to be used in the print position adjustment mode of the present embodiment. The adjustment pattern in the present embodiment includes a coarse adjustment pattern 2000 in addition to the first pattern 1800, the second pattern 1801, and the third pattern 1802 described in the first embodiment. Then, all of these patterns are printed on one print medium P in A4 size.

The coarse adjustment pattern 2000 is printed at the head in the conveyance direction (Y direction) prior to the first to third patterns 1800 to 1802 for fine adjustment. Then, before printing of the first to third patterns 1800 to 1802, the coarse adjustment pattern 2000 is read, and a range of the dot shift amount (ejection timing) is set for the multiple patches to be printed in the first to third patterns.

Figure 19:
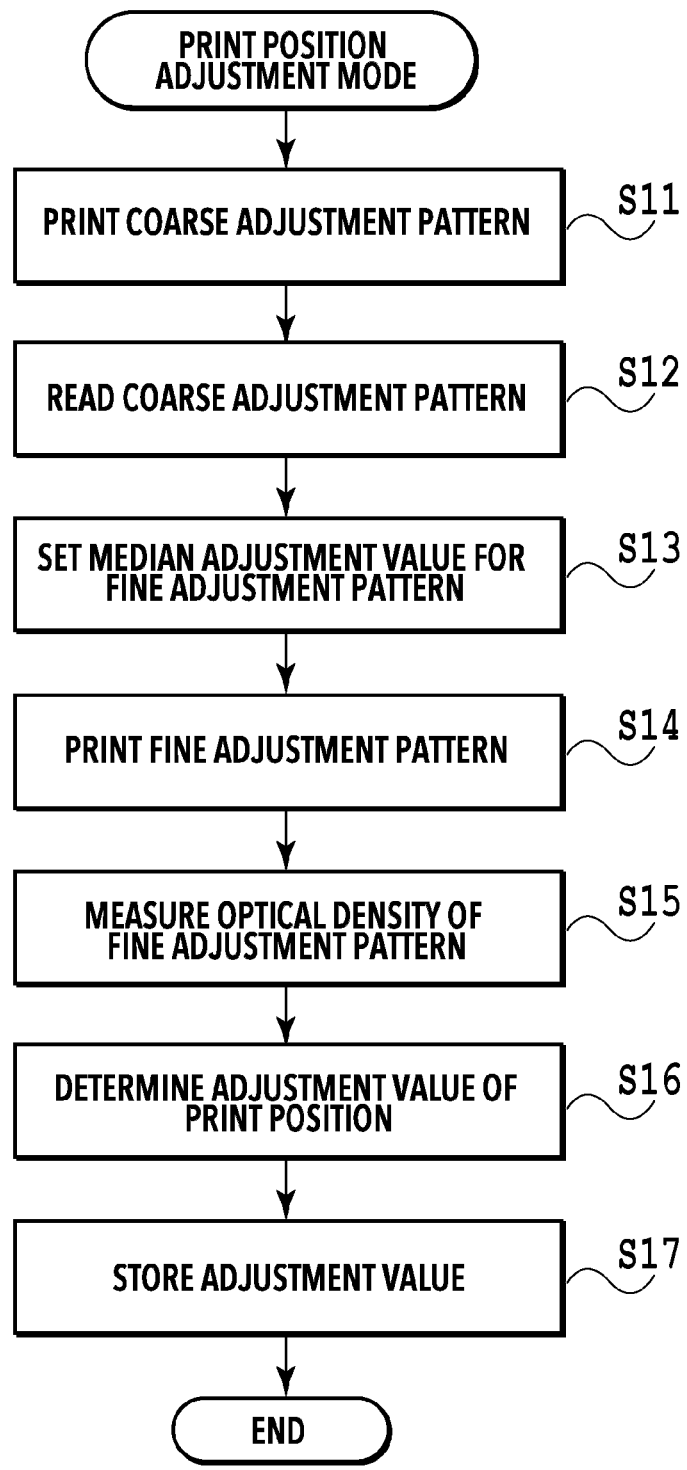
FIG. 19 is a flowchart of a print position adjustment mode in the third embodiment.

FIG. 19 is a flowchart for explaining steps in processing in the print position adjustment mode of the present embodiment. Hereinafter the steps will be described with reference to the adjustment pattern in FIG. 18.

Upon start of this processing, the CPU 901 first prints the coarse adjustment pattern 2000 on a print medium P at S11. As illustrated in FIG. 18, the coarse adjustment pattern 2000 is printed at the head of the print medium P in the conveyance direction (Y direction).

As illustrated in FIG. 18, the coarse adjustment pattern 2000 includes pattern groups 2001 to 2006 for the respective inks of six colors. Each of the pattern groups 2001 to 2006 includes five columns and three rows of patches. In the coarse adjustment, the influence of the print position misalignment due to the variation of the head-to-paper distance does not have to be considered to the same degree as in the fine adjustment. Therefore, in the present embodiment, the pattern groups 2001 to 2006 are arranged at equal intervals in the X direction irrespective of the positions of the platen ribs 1303.

Here, the pattern group 2001 for the cyan ink is focused. The five patches in the patch row 2007 are printed by the ejection port array C1 (see FIG. 4) in the forward scan. The five patches in the patch row 2008 are printed by the ejection port array C1 in the backward scan. The five patches in the patch row 2009 are printed by the ejection port array C2 in the forward scan. The same applies to the other pattern groups 2002 to 2006 for the different ink colors.

At S12, the CPU 901 performs processing of reading the patches included in the coarse adjustment pattern 2000 by using the reflection-type optical sensor 130. Specifically, the CPU 901 conveys the print medium P such that the printed coarse adjustment pattern 2000 is located within a region readable by the reflection-type optical sensor 130, and causes the reflection-type optical sensor 130 to perform the reading processing while scanning the carriage 102.

At S13, the CPU 901 sets median adjustment values for the fine adjustment pattern based on the image read at S12. Here, the median adjustment value is a value equivalent to a median value of the print positions in the 13 patches for the same adjustment item in the fine adjustment pattern. Specifically, an average value of the amounts of misalignment between the edge positions of the patches in the patch row 2007 in the X direction and the edge positions of the patches in the patch row 2008 in the X direction is obtained. Then, the print position in the forward and backward scans for correcting this amount of misalignment is set as the median adjustment value for cyan in the first pattern 1800. In addition, at S13, the CPU 901 sets the median adjustment values for the second pattern 1801 based on the edge positions in the patch row 2007 and the patch row 2008. Further, the CPU 901 sets the median adjustment values for the third pattern 1802 based on the edge positions of the patch groups of the different colors.

At S14, the CPU 901 prints the adjustment pattern for fine adjustment, that is, the first pattern 1800, the second pattern 1801, and the third pattern 1802 based on the median adjustment values set at S13.

At S15, the CPU 901 measures the optical density of each of the patches included in the first pattern 1800, the second pattern 1801, and the third pattern 1802 by using the reflection-type optical sensor 130.

At S16, the CPU 901 determines the adjustment value of the print position for each of the aforementioned items based on the optical densities of the patches obtained at S15.

At S17, the CPU 901 stores the adjustment values determined at S16 in the ROM 902 in association with the respective adjustment items. This processing is completed at the end of this step.

The adjustment values stored at S17 are used afterwards to print actual images and enable the printing apparatus 1 to output images without print position misalignment.

The execution of the coarse adjustment processing prior to the fine adjustment processing as in the present embodiment makes it possible to reduce the adjustment range, that is, the number of patches actually printed on a print medium in the fine adjustment processing. For this reason, even if a print head having a large variation of the print position misalignment is used, the print positions can be adjusted appropriately only by printing a predetermined number of patches.

Although the adjustment pattern in the first embodiment described with reference to FIG. 16 is used above for the fine adjustment processing, the adjustment pattern for fine adjustment may be the adjustment pattern in the second embodiment described with reference to FIG. 17 as a matter of course.

Fourth Embodiment

In the above embodiments, two patches with different shift amounts are arranged within the 6 mm areas on both sides of each platen rib 1303 symmetrically in the right-left direction in order that the variation of the head-to-paper distance can be kept within 100 μm. In contrast to this, the patches in the present embodiment are arranged at positions that can coincide with the sampling cycles of the reflection-type optical sensor 130 while satisfying the condition that the positions should be within the 6 mm areas on both sides.

FIGS. 20A and 20B are diagrams for comparing the print positions of the patches in the present embodiment with the print positions in the aforementioned embodiments. FIG. 20A illustrates the patch print positions without consideration of the sampling cycles and FIG. 20B illustrates the patch print positions in the present embodiment in consideration of the sampling cycles. FIGS. 20A and 20B illustrate enlarged views of the platen ribs 1303 of R6 and R7 and patches 1404 to 1407 printed around these platen ribs 1303.

A lower portion of FIG. 20B indicates sampling timings 2200 of the reflection-type optical sensor 130 that moves in the X direction at a predetermined velocity. A region where the reflection-type optical sensor 130 moves within a period of pulse application is each of sampling sections 2201 to 2206.

For example, in the sampling section 2201, the spot diameter of the reflection-type optical sensor 130 moves from 2207 to 2208, and this movement region is a sampling region. In the sampling section 2202, the spot diameter of the reflection-type optical sensor 130 moves from 2209 to 2210, and this movement region is a sampling region. The sampling regions in the sampling section 2201 and the sampling section 2202 are located at positions approximately symmetric with respect to the platen rib 1303 of R6.

However, the sampling cycles of the reflection-type optical sensor 130 are not synchronized with the positions where the platen ribs 1303 are arranged. For example, the sampling regions in the sampling section 2205 and the sampling section 2206 are not located at positions symmetric with respect to the platen rib 1303 of R7.

For this reason, in FIG. 20A in which two patches are printed symmetrically in the right-left direction with respect to each platen rib 1303 without consideration of the sampling cycles, the sampling regions protrude from the patches. In this case, the detection accuracy of the reflection-type optical sensor 130 may decrease.

To avoid this situation, the sampling timings of the reflection-type optical sensor 130 may not be set in fixed cycles but may be set according to the positions where the platen ribs 1303 are arranged. In this case, however, a new electric circuit, memory capacity, and firmware processing time are required, which causes an increase in cost.

For this reason, in the present embodiment, each of the patches is shifted to a position including the sampling region with a limitation of the 6 mm area on either side of the corresponding platen rib 1303 while the sampling cycles of the reflection-type optical sensor 130 are kept constant. Specifically, as illustrated in FIG. 20B, two patches 1406 and 1407 in the vicinity of the platen rib 1303 of R7 are arranged to include the sampling regions in the two sampling sections 2205 and 2206 closest to the platen rib 1303 of R7. As a result, in the case of FIG. 20B, the two patches 1406 and 1407 are not arranged symmetric with respect to the platen rib 1303 of R7, but are shifted to the right by approximately 0.2 mm with respect to the platen rib 1303. Even in such a situation, the two patches are confined to the 6 mm areas on both sides of the platen rib 1303. Thus, it is possible to perform the print position adjustment mode with high accuracy while keeping the variation of the head-to-paper distance within 100 μm.

In sum, according to the present embodiment, it is possible to perform the print position adjustment mode with high accuracy while keeping the sampling cycles of the reflection-type optical sensor 130 constant and saving consumption of print media.

Fifth Embodiment

A degree of unevenness on a print medium P varies depending on various conditions such as the type of the print medium, an environment temperature, and an environment humidity. In other words, an area where the patch can be arranged is not limited to the 6 mm area from the platen rib 1303 but is also adjustable depending on the above conditions. The present embodiment intends to change the number of patches arranged in the vicinity of the platen rib 1303 in the adjustment pattern as appropriate.

FIGS. 21A to 21C are diagrams for explaining processing of setting the number of patches. In this processing, N same test patches are printed above one platen rib 1303 and on both sides of this platen rib 1303 as illustrated in FIG. 21A. The N test patches are the same as the patch described with reference to FIG. 8, and are printed according to the adjustment value set at this time point. FIG. 21B is a top view of the N test patches. Here, N is 5 and the test patches 1 to 5 are illustrated.

Next, the optical density of each of the test patches is measured by using the reflection-type optical sensor 130. In this example, it is assumed that the optical densities as illustrated in FIG. 21C are obtained. The test patch 3 above the platen rib 1303 where no print position misalignment occurs has the highest density, and the density of the test patch becomes lower as the distance from the platen rib 1303 increases.

In the present embodiment, a density difference ΔD corresponding to a tolerable range of print position misalignment is determined in advance and patches can be printed only at positions corresponding to test patches each having a density difference ΔD or less in the actual print position adjustment mode. In the case of FIG. 21C, patches can be arranged at three areas corresponding to the test patches 2 to 4.

FIGS. 22A and 22B are diagrams illustrating how patches are printed in the X direction in the print position adjustment mode of the present embodiment. FIG. 22A depicts an overall view in the X direction and FIG. 22B depicts an enlarged view of an area around the platen rib 1303 of R4. Here, an adjustment pattern for adjusting the print positions in the forward scan and the print positions in the backward scan by using a print medium P in A4 size is illustrated as an example. Regarding each of the platen ribs 1303 of R4 to R7, three patches 2401 to 2403 each having a width of 4.7 mm are arranged next to each other with the platen rib 1303 centered. The positions of these three patches are included in an area around the position of the platen rib 1303 where the print position misalignment due to the variation of the head-to-paper distance is confirmed sufficiently small. Therefore, the print position misalignment is within the tolerable range, and the favorable print position adjustment can be performed.

In the adjustment pattern of FIG. 22A, the width in the X direction for printing the same numbers of patches is narrower than in the adjustment pattern in FIG. 15A. For this reason, in the print position adjustment mode using the adjustment pattern in FIG. 22A, the movement range of the carriage is narrower than in the case of using the adjustment pattern in FIG. 15A, so that the mode itself can be completed within a shorter time. In addition, if the patches are shifted as a whole to the center (the left side in FIG. 22A) in the adjustment pattern in FIG. 22A, a print medium in a size smaller than A4 can be used. This also makes it possible to further save consumption of print media.

OTHER EMBODIMENTS

In the embodiments described above, the description is given on the assumption that the print medium P in A4 size is used. Instead, needless to say, the adjustment patterns described in the above embodiments may be also printed on print media larger than the A4 size.

Figure 23B:
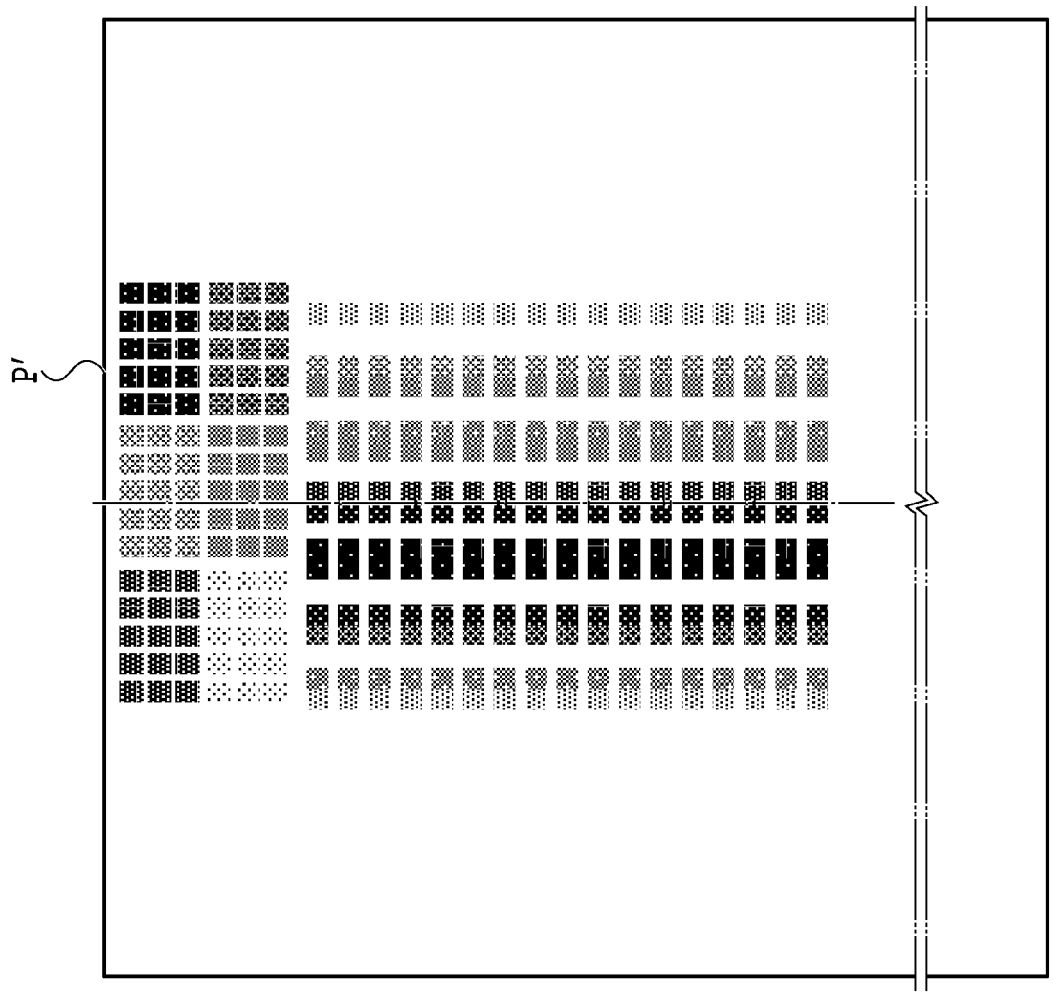
FIGS. 23A and 23B are diagrams illustrating cases where an adjustment pattern is printed on print media in different sizes.
Figure 23A:
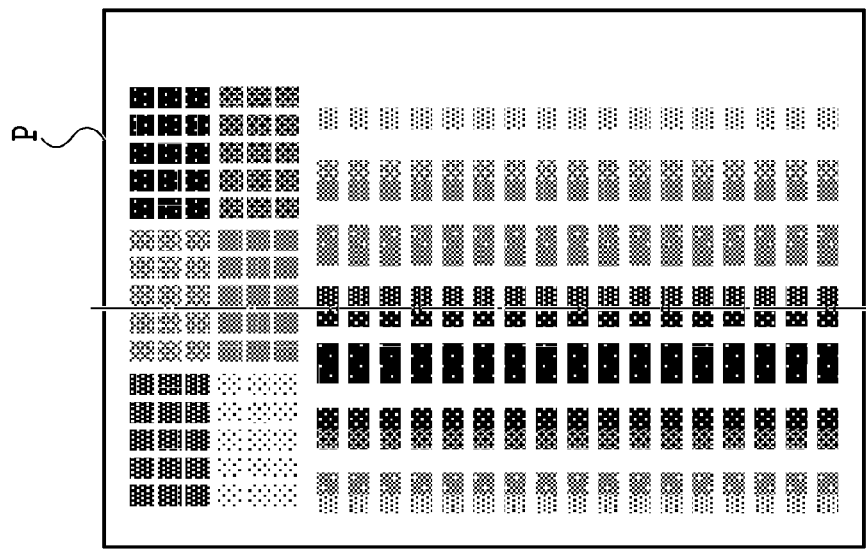

FIGS. 23A and 23B are diagrams illustrating cases where the pattern in FIG. 18 is printed on a print medium P in A4 size and a print medium P' in A3 size. In each of FIGS. 23A and 23B, an alternate long and short dash line corresponds to an area supported by the platen rib 1303 of R7 in the course of conveying a print medium P.

As described above, the printing apparatus 1 in the above embodiments conveys a print medium P with the center of the print medium P aligned with the center line 1305 of the printable region W irrespective of the size of the print medium used. For this reason, in the print position adjustment mode, the relative positional relation between the patches included in the adjustment pattern and the platen ribs 1303 is stable irrespective of the size of a print medium. In sum, use of a print medium in a predetermined size or larger in the print position adjustment mode makes it possible to perform stable print position adjustment while avoiding a variation of the adjustment accuracy.

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2019-236668 filed Dec. 26, 2019, which is hereby incorporated by reference wherein in its entirety.

What is claimed is:

1. A printing apparatus comprising:
a printing device including a plurality of printing elements to form dots on a print medium by applying ink droplets while scanning in a scanning direction;
a conveyance member configured to convey a print medium in a conveyance direction crossing the scanning direction; and
a plurality of platen ribs configured to be arranged on a conveyance route of a print medium at positions facing the printing device at predetermined pitches in the scanning direction and to support the print medium, wherein
the printing device prints an adjustment pattern on a print medium in response to reception of an instruction to adjust print positions of ink droplets to be applied by the printing device, the adjustment pattern including a plurality of patches and being for use for adjustment, and
wherein
the printing device prints the adjustment pattern such that there is printed a first patch group in which two or more patches are printed adjoining to each other in the scanning direction in an area supported by a first platen rib among the plurality of platen ribs, there is printed a second patch group in which two or more patches are printed adjoining to each other in the scanning direction in an area supported by a second platen rib next to the first platen rib and that no patches are printed in an area between the first patch group and the second patch group in the scanning direction.

2. The printing apparatus according to claim 1, wherein the area supported by the first platen rib and the area supported by the second platen rib are areas where a variation of a distance between the printing device and the print medium in a state where the printing device faces the print medium is within a predetermined range.

3. The printing apparatus according to claim 2, wherein the area between the first patch group and the second patch group is an area where the variation of the distance exceeds the predetermined range.

4. The printing apparatus according to claim 1, wherein each of the plurality of patches includes a first dot group and a second dot group, and
the plurality of patches are different from each other in terms of relative print positions of the first dot group and the second dot group.

5. The printing apparatus according to claim 4, wherein the printing device prints the first dot group in a forward scan in which the printing device scans in the scanning direction, and prints the second dot group in a backward scan in which the printing device scans in a direction reverse to the scanning direction.

6. The printing apparatus according to claim 4, wherein the printing device includes a first ejection port array in which ejection ports that eject a first ink are arrayed in the conveyance direction, and a second ejection port array in which ejection ports that eject the first ink are arrayed in the conveyance direction, the second ejection port array overlapping the first ejection port array as viewed in the scanning direction, and
the printing device prints the first dot group by using the first ejection port array, and prints the second dot group by using the second ejection port array.

7. The printing apparatus according to claim 4, wherein the printing device includes a first ejection port array in which ejection ports that eject a first ink are arrayed in the conveyance direction, and a second ejection port array in which ejection ports that eject a second ink different from the first ink are arrayed in the conveyance direction, the second ejection port array overlapping the first ejection port array as viewed in the scanning direction, and
the printing device prints the first dot group by using the first ejection port array, and prints the second dot group by using the second ejection port array.

8. The printing apparatus according to claim 4, wherein the printing device includes a first ejection port array in which ejection ports that eject a first ink are arrayed in the conveyance direction, a second ejection port array in which ejection ports that eject the first ink are arrayed in the conveyance direction, the second ejection port arrays overlapping the first ejection port array as viewed in the scanning direction, and a third ejection port array in which ejection ports that eject a second ink different from the first ink are arrayed in the conveyance direction, the third ejection port array overlapping the first ejection port array as viewed in the scanning direction, and
the printing device prints, on the same print medium,
a first pattern in which the first dot group is printed in a forward scan in which the printing device scans in the scanning direction, and the second dot group is printed in a backward scan in which the printing device scans in a direction reverse to the scanning direction,
a second pattern in which the first dot group is printed by the first ejection port array, and the second dot group is printed by the second ejection port array, and
a third pattern in which the first dot group is printed by the first ejection port array, and the second dot group is printed by the third ejection port array.

9. The printing apparatus according to claim 1, further comprising:
a detection unit configured to detect an optical density of each of the plurality of patches while scanning in the scanning direction; and
a setting unit configured to set an adjustment value of a print position of each ink droplet to be applied by the printing device for printing an actual image based on the optical densities of the plurality of patches detected by the detection unit.

10. The printing apparatus according to claim 9, wherein the setting unit sets, as the adjustment value, the print position of the ink droplet applied by the printing device for the patch having the highest optical density among the plurality of patches.

11. The printing apparatus according to claim 9, wherein the printing device prints patch groups including the first patch group and the second patch group in a manner coincident with a sampling cycle of the detection unit in the scanning direction.

12. The printing apparatus according to claim 1, wherein patches in the first patch group and the second group are printed by using the same ejection port array of the printing device.

13. The printing apparatus according to claim 1 wherein patches in the first patch group are printed by using different ejection port arrays of the printing device and patches in the second patch group are printed by using different ejection port arrays of the printing device.

14. The printing apparatus according to claim 1, wherein the area between the first patch group and the second patch group includes a center position between the first platen rib and the second platen rib.

15. The printing apparatus according to claim 1, wherein, for each of the first platen rib and the second platen rib,
 a patch is printed on one side of the platen rib in the scanning direction, and
 another patch is printed on the other side of the platen rib in the scanning direction.

16. The printing apparatus according to claim 1, wherein, for each of the first platen rib and the second platen rib,
 at least a part of a patch is printed on one side of the platen rib in the scanning direction, and
 at least a part of another patch is printed on the other side of the platen rib in the scanning direction.

17. The printing apparatus according to claim 1, wherein prior to printing of the adjustment pattern, the printing device prints a coarse adjustment pattern for adjusting print positions of the dots with more coarse accuracy than that of the adjustment pattern and changes the print positions of the dots in the plurality of patches in the adjustment pattern based on a state of the coarse adjustment pattern printed on the print medium.

18. The printing apparatus according to claim 17, wherein the coarse adjustment pattern is printed in the area between the first patch group and the second patch group.

19. The printing apparatus according to claim 1, wherein prior to printing of the adjustment pattern, the printing device prints a plurality of same test patches adjoining to each other in the scanning direction around a certain platen rib and changes the number of the patches in the first patch group and the second patch group based on states of the plurality of test patches printed on the print medium.

20. The printing apparatus according to claim 1, wherein the plurality of platen ribs are arranged symmetrically in the scanning direction with respect to a center line of a region printable by the printing device.

21. The printing apparatus according to claim 1, wherein the printing device prints the first patch group within 6 mm areas on both sides of the first platen rib and prints the second patch group within 6 mm areas on both sides of the second platen rib.

22. The printing apparatus according to claim 1, wherein the printing device prints the first patch group at positions symmetric with respect to the first platen rib and prints the second patch group at positions symmetric with respect to the second platen rib.

23. The printing apparatus according to claim 1, wherein the printing device keeps constant a positional relation in the scanning direction between the first and second platen ribs and the first patch group and the second patch group irrespective of a size of the print medium.

24. A printing method for a printing apparatus including a printing device, conveying member and a plurality of platen ribs,
 wherein
 the printing device is configured to form dots on a print medium by applying ink droplets while scanning in a scanning direction,
 the conveying member is configured to convey a print medium in a conveyance direction crossing the scanning direction, and
 the plurality of platen ribs is arranged on a conveyance route of a print medium at positions facing the printing unit at predetermined pitches in the scanning direction and configured to support the print medium,
 the printing method comprising:
 receiving step of receiving an instruction to adjust print positions of ink droplets to be applied by the printing unit, and
 printing step of printing an adjustment pattern including a plurality of patches and being for use for the adjustment,
 wherein
 the adjustment pattern is printed such that there is printed a first patch group in which two or more patches are printed adjoining to each other in the scanning direction in an area supported by a first platen rib among the plurality of platen ribs, there is printed a second patch group in which two or more patches are printed adjoining to each other in the scanning direction in an area supported by a second platen rib next to the first platen rib and that no patches are printed in an area between the first patch group and the second patch group in the scanning direction.

* * * * *